(12) United States Patent
Zugic et al.

(10) Patent No.: US 12,337,290 B2
(45) Date of Patent: Jun. 24, 2025

(54) ELECTRICAL COUPLER FOR RESISTIVELY HEATED REACTOR SYSTEMS

(71) Applicant: Lydian Labs, Inc., Cambridge, MA (US)

(72) Inventors: Branko Zugic, Cambridge, MA (US); Joseph Rodden, Cambridge, MA (US); Theo Amendola, Cambridge, MA (US); Zachary Modest, Cambridge, MA (US); Joseph Benjamin, Cambridge, MA (US)

(73) Assignee: Lydian Labs, Inc., Cambridge, MA (US)

( * ) Notice: Subject to any disclaimer, the term of this patent is extended or adjusted under 35 U.S.C. 154(b) by 0 days.

(21) Appl. No.: 18/758,642

(22) Filed: Jun. 28, 2024

(65) Prior Publication Data
US 2025/0001381 A1    Jan. 2, 2025

Related U.S. Application Data

(60) Provisional application No. 63/524,468, filed on Jun. 30, 2023.

(51) Int. Cl.
*B01J 8/06* (2006.01)
*B01J 12/00* (2006.01)
*B01J 19/24* (2006.01)

(52) U.S. Cl.
CPC .............. *B01J 12/007* (2013.01); *B01J 8/067* (2013.01); *B01J 2208/00415* (2013.01); *B01J 2219/0809* (2013.01); *B01J 2219/0815* (2013.01)

(58) Field of Classification Search
CPC ..................... B01J 12/007; B01J 8/067; B01J 2208/00415; B01J 2219/0809; B01J 2219/0815
(Continued)

(56) References Cited

U.S. PATENT DOCUMENTS 11,173,545 B2    11/2021    Qi et al.
2006/0124445 A1    6/2006    Labrecque et al.
(Continued)

FOREIGN PATENT DOCUMENTS

CN    1514508 A  *  7/2004
WO    2021110809 A1    6/2021
(Continued)

OTHER PUBLICATIONS

Chen, Xiaodong, et al., "Recent Advances in Supported Metal Catalysts and Oxide Catalysts for the Reverse Water-Gas Shift Reaction", Frontiers in Chemistry, Aug. 2020, vol. 8, Article 709.
(Continued)

*Primary Examiner* — Huy Tram Nguyen
(74) *Attorney, Agent, or Firm* — Jeffrey Schox; Randy Mehlenbacher

(57) ABSTRACT

An electrical coupler for a resistively heated reactor system including an electrical conductor having a first end and a second end, defining a thickness therebetween, each of the first end and the second end having a first interface in the first end and a second interface in the second end and, at least one opening extending from the first end to the second end, the at least one opening configured to allow a fluid to flow through the electrical coupler.

23 Claims, 22 Drawing Sheets

(58) Field of Classification Search
USPC .......................................................... 422/198
See application file for complete search history.

(56) References Cited

U.S. PATENT DOCUMENTS

| | | |
|---|---|---|
| 2021/0113983 A1 | 4/2021 | Mortensen et al. |
| 2021/0238035 A1 | 8/2021 | Mortensen et al. |
| 2022/0306559 A1 | 9/2022 | Mortensen et al. |

FOREIGN PATENT DOCUMENTS

| | | |
|---|---|---|
| WO | 2022221740 A1 | 10/2022 |
| WO | 2024086300 A1 | 4/2024 |

OTHER PUBLICATIONS

Subramanian, Siddhartha et al."Geometric Catalyst Utilization in Zero-Gap CO2 Electrolyzers", ACS Energy Letters. vol 8. No. 1. Article. Jan. 2023. DOI: https://doi.org/10.1021/acsenergylett.2c02194.

Zhang, Xiao , "A stable low-temperature H2-production catalyst by crowding Pt on α-MoC", Nature, Article, vol. 589—Jan. 21, 2021, https://doi.org/10.1038/s41586-020-03130-6.

* cited by examiner

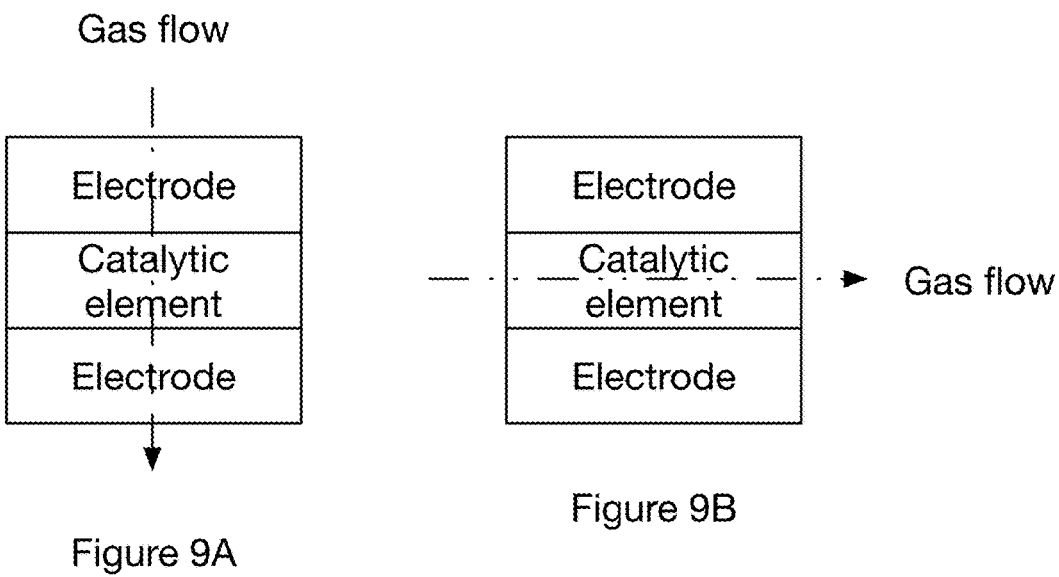
Figure 9A
Figure 9B
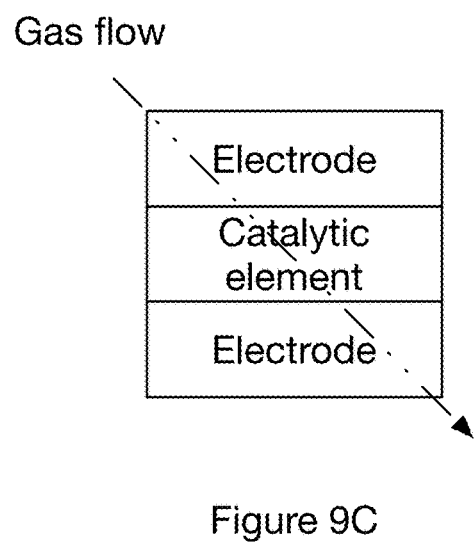
Figure 9C
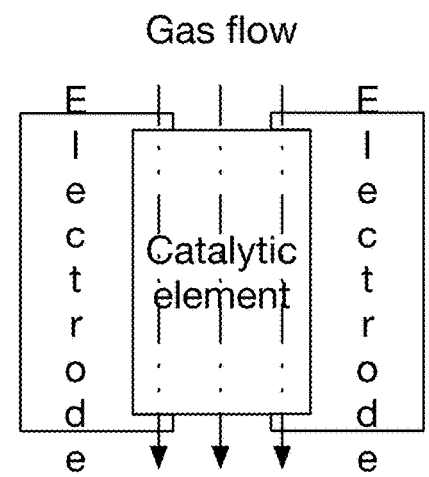
Figure 9D

ELECTRICAL COUPLER FOR RESISTIVELY HEATED REACTOR SYSTEMS

CROSS-REFERENCE TO RELATED APPLICATIONS

This application claims the benefit of U.S. Provisional Application No. 63/524,468 filed 30 Jun. 2023, which is incorporated in its entirety by this reference.

TECHNICAL FIELD

This invention relates generally to the resistive heating field, and more specifically to a new and useful electrical coupler (e.g., electrode) and/or method of use in the resistive heating field.

BACKGROUND

Traditional catalytic reactor systems are heated via the external combustion of fuel. The heat of combustion is transferred into the process stream through the reactor wall by radiative and conductive heat transfer mechanisms to drive reactions inside the system. This allows the heat generation mechanism to be decoupled from the catalytic surface and process gas but suffers from poor heat utilization and generates large amounts of $CO_2$ from the combustion process. Heat transfer efficiencies of 50% or less are typical of these systems. There is thus a need for more efficient and economic ways to heat reactor systems.

BRIEF DESCRIPTION OF THE FIGURES

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 9A-9F are schematic representations of examples of reactive components for a resistively heated reactor with exemplary fluid flow paths represented.

DETAILED DESCRIPTION

The following description of the embodiments of the invention is not intended to limit the invention to these embodiments, but rather to enable any person skilled in the art to make and use this invention.

1. Overview

Figure 8:
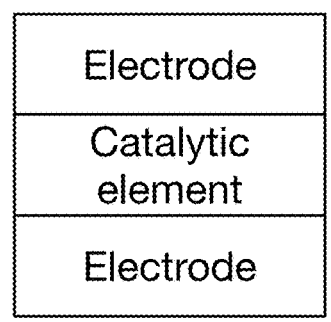
FIG. 8 is a schematic representation an example of a reactive component of a resistively heated reactor.

As shown in FIG. 8, the system preferably includes an electrode pair (e.g., anode and cathode, electric couplers) and a catalytic element. The electrode pair and catalytic element are preferably configured to allow fluid (e.g., gas, liquid) flow through the electrode pair and the catalytic element. In preferred embodiments, the electrode pair are configured to have less pressure drop for fluid passing through than the catalytic element.

A specific example of the system can include an electrical coupler (e.g., for a resistively heated reactor system), the electrical coupler including an electrical conductor having a first end and a second end, defining a thickness therebetween, each of the first end and the second end having a first interface in the first end and a second interface in the second end, and at least one opening extending from the first end to the second end, the at least one opening configured to allow a fluid to flow through the electrical coupler.

In another specific example of the system, a system (e.g., a reactor, resistively heated reactor, etc.) can include a pressure vessel having a first vessel end and a second vessel end with a sidewall circumscribing each and extending therebetween, a first electrical coupler disposed at the first vessel end, the first electrical coupler having a first electrical conductor having a first end and a second end, defining a thickness therebetween, and coupled to the first circular end of the pressure vessel at least one opening extending from the first end to the second end, the at least one opening configured to allow a fluid to flow therethrough into the pressure vessel, a second electrical coupler disposed at the second vessel end, the second electrical coupler having a second electrical conductor having a third end and a fourth end, defining a thickness therebetween, and coupled to the second vessel end of the pressure vessel at least one opening extending from the third end to the fourth end, the at least one opening configured to allow a fluid to flow from the pressure vessel through the second electrical coupler, a catalytic element disposed within the pressure vessel, the catalytic element in contact with the first electrical coupler and the second electrical coupler.

Figure 11:
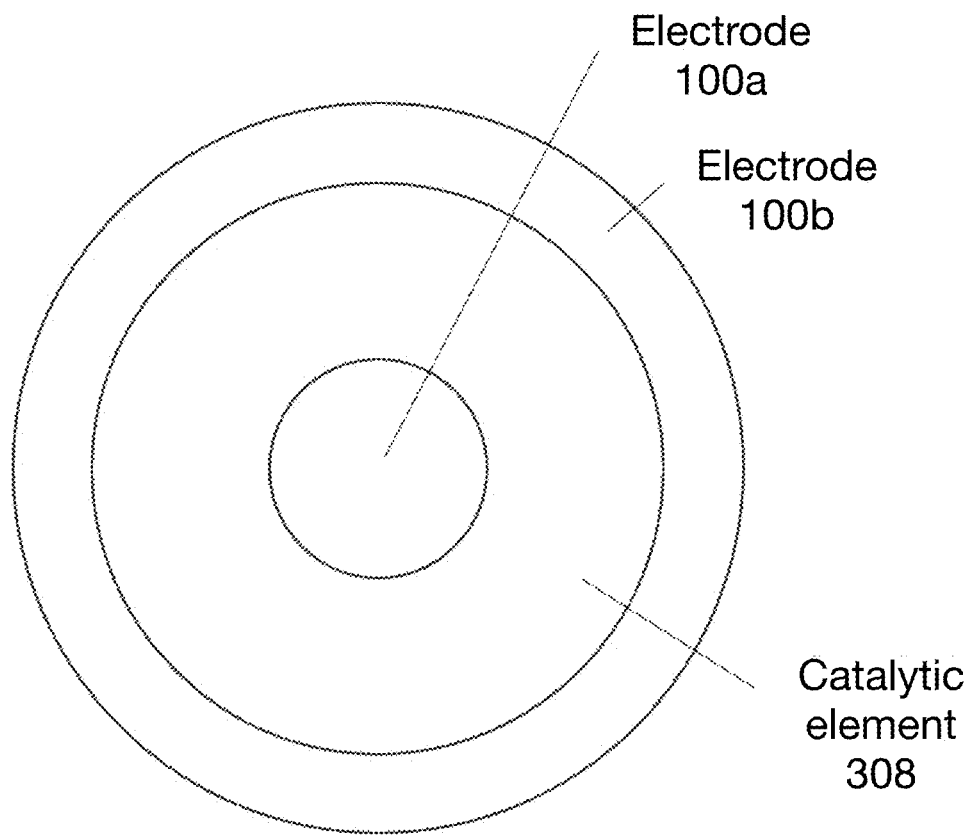
FIG. 11 is a schematic representation of an example of an exemplary catalytic element with electrical connections across a width (e.g., diameter) of the catalytic element.

In a third specific example of the system, a resistively heated reactor can include a proximal end (e.g., having a planar porous fluid inlet), at least one catalytic element having a first end and a second end with a sidewall extending therebetween, a first electrical coupler having a first end and a second end, defining an electrical coupler sidewall therebetween, the electrical coupler sidewall configured to circumscribe a first portion of the sidewall of the at least one catalytic element, a second electrical coupler having a first end and a second end, defining an electrical coupler sidewall therebetween, the electrical coupler sidewall configured to circumscribe a second portion of the sidewall of the at least one catalytic element, the second electrical coupler laterally spaced from the first electrical coupler, a first separator disposed between the first and second electrical couplers circumscribing the at least one catalytic element, a second separator disposed between the first and second electrical couplers circumscribing the at least one catalytic element, the second separator spaced oppositely from the first separator and a distal end having a planar porous fluid outlet. In variations of the third specific example (as shown for instance in FIG. 11), the electrical coupler connections can be made across a diameter or width of the catalytic element (e.g., a first electrical coupler can be encircled, surrounded, enclosed, etc. within a catalytic element which can be encircled, surrounded, enclosed, etc. by a second electrical coupler).

In some variations of the first, second, or third illustrative examples above, the positive and negative couplers of individual assemblies (coupler-catalytic element-coupler assemblies) can be connected in parallel, series, or a combination of the two within a single pressure vessel (e.g., to enable a multi-cellular arrangement). These multi-cellular arrangements can be beneficial for tuning the voltage and/or current requirements of the reactor system.

However, other suitable reactor configurations, catalytic elements, and/or electrical couplers can be used.

2. Technical Advantages

Variants of the technology can confer one or more advantages over conventional technologies.

Thermal reactor systems often operate at high temperatures (e.g., exceeding 1000° C.) and pressures (e.g., exceeding 1 Bar) under corrosive gas (e.g., in the presence of one or more of carbon monoxide, hydrogen, oxygen, ozone, ammonia, carbon dioxide, sulfur oxides, nitrogen oxides, fluorine, chlorine, bromine, iodine, hydrogen sulphide, ethylene oxide, carbonyl sulphide, methyl mercaptan, ethyl mercaptan, propyl mercaptan, butyl mercaptan, hydrogen cyanide, silane, phosphine, etc.) conditions. Thus, variants of the invention can include a design for electrical couplers (e.g., contactors, electrodes, etc.) that can be used to provide electrical energy or current to a catalyst without significantly affecting reactor performance (e.g., without shortening a reactor lifetime). For example, structured electrical contacts can be designed to possess low resistivity relative to the catalyst (e.g., catalytic element), are fluidically permeable to fluid flow, and are stable to degradation (e.g., caused by corrosive gas environments, elevated pressures, elevated temperatures, etc.).

Second, variants of the electrical couplers can contain features that allow them to be used as structural members, electrical interfaces, pressure vessel components, and/or compliant sub-components (among others), thereby reducing a complexity of the reactor design and/or reducing a number of parts.

Third, variants of the technology can be designed to mitigate a risk of damage to an electrode. In variants that include a straight catalytic member where fluid flows substantially parallel to a long axis of the catalytic member, the downstream electrode is often exposed to the most reactive conditions (as shown for example in FIG. 9A) and thus can be prone to degradation. To overcome this problem, the catalytic member can be designed such that both (or all when more than two electrodes are used) electrodes are upstream of the catalytic member relative the fluid flow. For instance, the catalytic member can have a chevron (e.g., V-shape), a U-shaped, convex, arched, boustrophedonic, zigzag, serpentine, or other similar shape where the ends of catalytic member are on a common side (e.g., where electrode broad faces are connected to the catalytic member substantially normally as shown for instance in FIG. 9D). In other examples, the second electrode can be arranged orthogonal to the first electrode where fluid does not substantially flow through the second electrode.

However, further advantages can be provided by the system and method disclosed herein.

3. Thermal Reactor

The thermal reactor preferably functions to perform (e.g., facilitate, enable, initiate, maintain, etc.) a reaction between two or more chemical species. The chemical species are typically in the fluid phase (e.g., gas, liquid, plasma, etc.). However, one or more chemical species could be solid phase and/or other suitable phase(s) of matter. For example, the thermal reactor can be used to perform a reverse gas water shift reaction (e.g., $H_2+CO_2 \rightarrow H_2O+CO$). Additionally or alternatively, the thermal reactor can be used to perform steam methane reforming ($CH_4+H_2O \leftarrow \rightarrow CO+3H_2$), dry methane reforming ($CH_4+CO_2 \leftarrow \rightarrow 2CO+2H_2$), Haber process ($N_2+3H_2 \leftarrow \rightarrow 2NH_3$), Kværner process ($C_nH_m \rightarrow nC+m/2H_2$), and/or other suitable industrial processes (particularly using gas phase reactants and ideally gas phase products, endothermic reactions, etc.).

The thermal reactor often operates at standard pressures or greater (e.g., between 1 atm and 100 atm). However (e.g., to control a product ratio, to control a byproduct recovery, etc.), the thermal reactor could be operated under reduced pressure (e.g., vacuum, pressure less than 1 atm, etc.).

As shown for example in FIG. 8, the thermal reactor can include a reaction module (e.g., an electrical coupler or electrode and a catalytic element). The thermal reactor can optionally include one or more of a pressure vessel, interface, compressive element, inlets and/or outlets (e.g., reagent and/or product ports), and/or other suitable elements.

In some variants, the thermal reactor can include a plurality of reaction modules. The plurality of reaction modules can be arranged in parallel (e.g., fluid flows through reach reaction module contemporaneously, concurrently, simultaneously, etc.), in series (e.g., fluid from one reaction module to a subsequent reaction module), and/or in any suitable combination thereof (e.g., a plurality of parallel reaction modules where one or more of the plurality include a plurality of reaction modules in series, branching reaction modules, etc.).

The reaction module preferably functions as a site for chemical reactions to be performed. The reaction module (e.g., a catalytic element thereof) preferably achieves a high operating temperature (e.g., greater than about 500° C., 600° C., 750° C., 800° C., 900° C., 1000° C., 1100° C., 1250° C., 1300° C., 1500° C., 2000° C., 2500° C., etc.), which can be beneficial for driving an equilibrium of the chemical reaction to preferred products. However, the thermal reactor can operate in any suitable manner.

The reactor temperature is preferably achieved via resistive heating (e.g., Joule heating, Ohmic heating, etc.). However, the reactor temperature can otherwise be achieved (e.g., dielectric heating, induction heating, etc. for suitable catalytic elements, reaction modules, etc.).

Energy to achieve the reactor temperature is preferably provided via renewable energy (e.g., in the form of electricity). When Joule heating (resistive heat) is used to power the system, it is preferred that the heat generation is closely coupled to the catalyst material to maximize heat transfer to catalytic sites. This format is characterized in that electrical feedthroughs are included that penetrate the reactor wall and supply large amounts of electrical power to catalytic elements housed within the reactor.

The electrical couplers (e.g., electrode) preferably function to provide electricity (e.g., electrical current, electrical energy, etc.) to the catalytic module. The electrical couplers preferably have a lower electrical resistance than the catalytic module (e.g., so that resistive heating occurs at the catalytic module rather than the electrical coupler).

Typically, two electrical couplers are used for each catalytic module (e.g., one acting as an anode and one acting as a cathode). However, greater numbers of electrical couplers can be used (e.g., a plurality of anodes and/or cathodes) which can be beneficial for improving a uniformity of heating of the catalytic element (e.g., by improving a uniformity of electric current, potential drop, etc. through the catalytic element). In some variants, a single electrical coupler can be used (e.g., where the electrical coupler is designed to have an anode and cathode acting regions and the catalytic element is designed to pass current throughout the catalytic element rather than shorting across a region of the catalytic element proximal the electric coupler).

In some variants, the electrical coupler can be designed to allow flow of fluid through the electrical coupler (e.g., as shown for example in FIG. 9A, FIG. 9C, FIG. 9E, FIG. 9F). In these variants, the electrical coupler preferably has a smaller pressure drop than the catalytic element (e.g., the electrical coupler has a smaller resistance to the flow of fluid). In addition to or alternative to the pressure drop, the electric coupler can additionally or alternatively be designed to achieve uniform electrical properties (e.g., electric current, potential drop, etc.) within the catalytic element (typically achieved by having greater coverage or contact between the catalytic element and the electrical coupler), pass a target current (e.g., 0.005 A, 0.01 A, 0.05 A, 0.1 A, 0.5 A, 1 A, 1.5 A, 2 A, 5 A, 10 A, 15 A, 20 A, 50 A, 500 A, 5000 A, etc.), to mitigate a risk of reactions or degradation occurring on the electrical coupler (e.g., generally achieved by having a smaller exposed surface area), and/or can otherwise be designed. Benefits of these variants can include, the electrical coupler acting to mix or improve mixing of the fluid prior to entering the catalytic element, increase a residence time of the fluid within the catalytic element, and/or can provide other suitable benefit(s).

Examples of electrical coupler structures that can be used to achieve fluid flow therethrough include boreholes or through-holes in the electrical coupler, mesh electric coupler, fibrous electrical coupler, porous electrical coupler, and/or other such techniques for enabling a fluid to pass through the electrical coupler.

In variants that use engineered fluid flow structures (e.g., boreholes, through-holes, etc.), the flow structures for electrical coupler pairs can be aligned (e.g., such that absent an object between the electrical couplers the fluid can flow along a straight or linear path between openings), anti-aligned (e.g., such that absent an object between the electrical couplers the fluid can not flow along a straight or linear path between openings), randomly or imperfectly aligned (e.g., such that absent an object between the electrical couplers the fluid can flow along a straight or linear path between a portion of openings or a portion of the openings), and/or can have any suitable alignment.

Figure 9E:
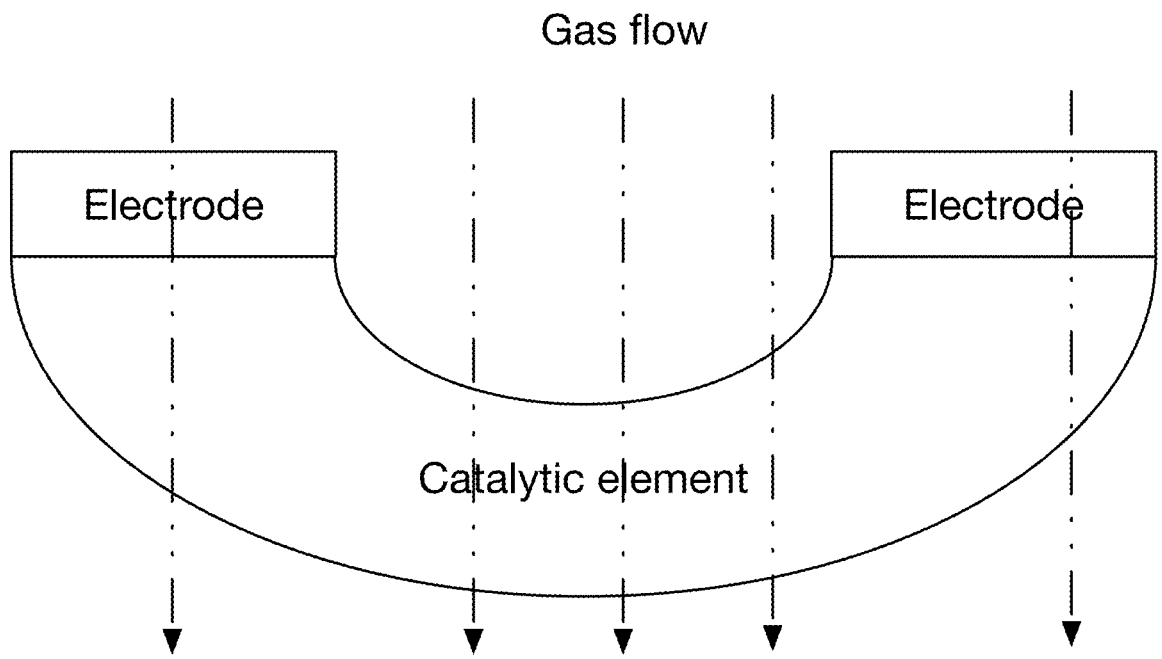
Figure 9F:
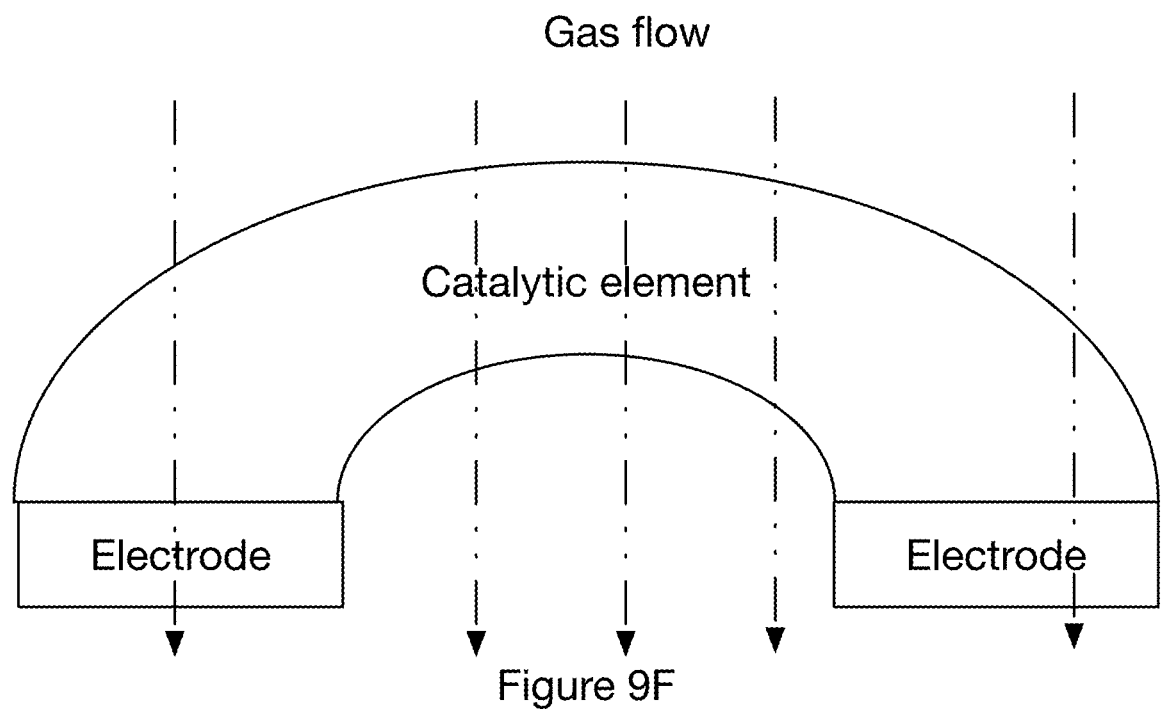
Figure 10:
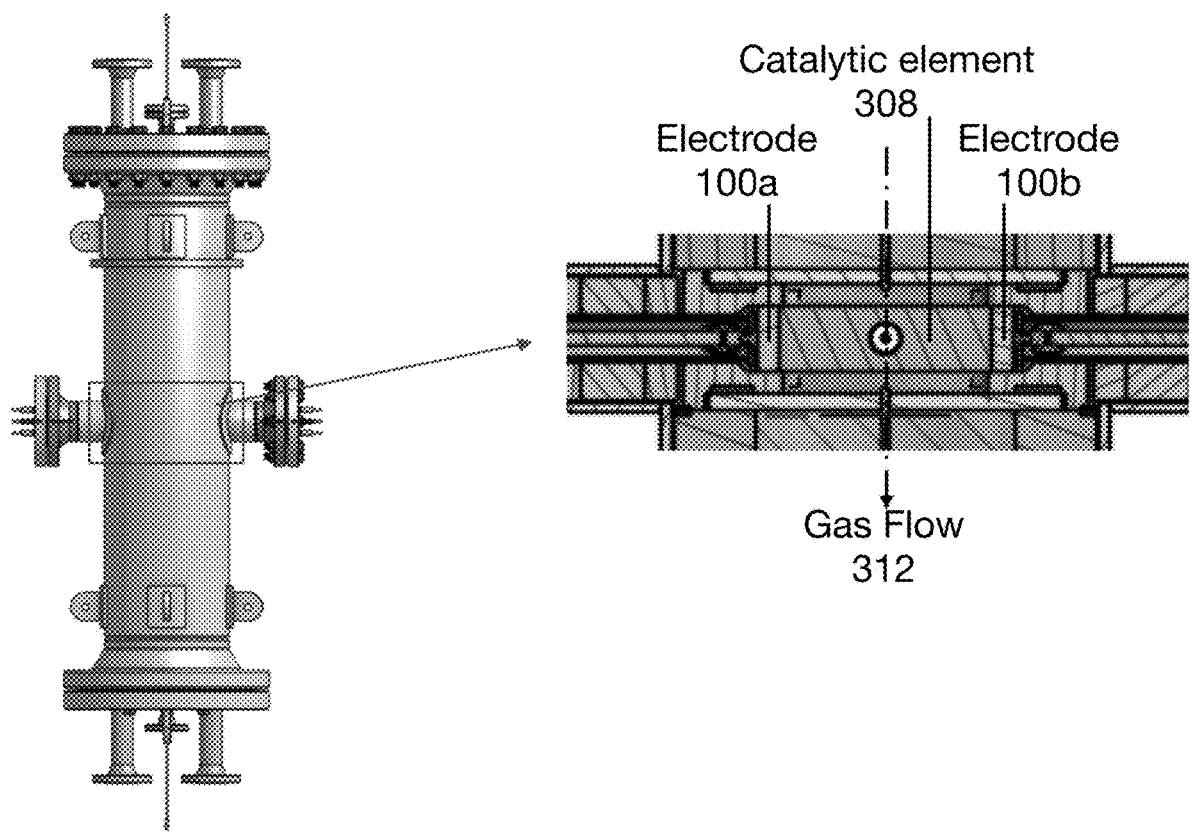
FIG. 10 is a schematic representation of an example of a catalytic element integrated into a reactor.

Typically, the electrical coupler is arranged so that a surface normal of a broad face of the electrical coupler is parallel to a fluid flow direction (as shown for example in FIG. 9A, FIG. 9E, or FIG. 9F). However, the electrical coupler can be arranged so that a surface normal of a broad face of the electrical coupler is perpendicular to the fluid flow direction (as shown for example in FIG. 9B, FIG. 9D, or FIG. 10) and/or intersects the fluid flow direction at an arbitrary angle (as shown for example in FIG. 9C).

In some variations (as shown for example in FIG. 9E), the reaction module can be designed so that the electrical couplers are arranged upstream relative to the catalytic element within the fluid stream. These variations can be achieved, for instance, by using U-shaped (e.g., horseshoe shaped, keyhole, omega-shaped, moon-like, lecotropal, etc.), V-shaped (e.g., chevron), boustrophedonic, zigzag, sinusoidal, serpentine, arcuate, and/or other suitably shaped catalytic elements where the ends of the catalytic element are on the same side (e.g., a surface normal to each end is parallel). These variations can provide a technical advantage of maintaining the electrical coupler are a lower temperature region within the fluid flow (thereby reducing degradation of the electrical coupler). Additionally, or alternatively, the reaction module can be designed such that a single electrical coupler is in the fluid path (e.g., a surface normal to each end of the catalytic element is perpendicular), where the single electrical coupler in the fluid path is preferably upstream relative to the catalytic element. However, the electrical couplers can be arranged downstream relative to the catalytic element in the fluid flow (as shown for example in FIG. 9F) and/or one electric coupler can be arranged upstream of the catalytic element and another electric coupler can be arranged downstream of the catalytic element (as shown for example in FIG. 9A or FIG. 9C).

The design of the electrical coupler preferably permits high volumes of a fluid, such as a gas or liquid, to flow through the electrical coupler (contactor) and be directed through the catalytic element. The fluid flow path exiting the electrical coupler preferably does not adversely affect the interaction of the gas phase with the catalytic element. The electrical coupler preferably distributes the fluid flow evenly across the cross-section of the catalytic element. The gas pathway of the electrical coupler may be a single opening (e.g., a hole or gap 0.5 to 10 cm in diameter), a plurality of smaller holes (0.01 to 5 cm in diameter), a tortuous pathway (e.g., porous, channels, gaps between fibers, etc.), and/or can otherwise be designed. In variants that use them, a plurality of smaller holes can allow for increased flow distribution across the catalytic element and provide a more distributed contact for current flow from the electrical coupler to the catalytic element (which can be beneficial for evenly heating the catalytic element). The pressure drop across the electrical coupler should be small compared to (e.g., <50% of, <30% of, <25% of, <20% of, <10% of, <5% of, <1% of, etc.) the pressure drop across the catalytic element (e.g., resistive element).

However, the electrical coupler can be designed such that fluid can only pass through a portion (or contact a portion of the surface of) of the electrical coupler (as shown for example in FIG. 9D) and/or fluid cannot pass through the electrical coupler (as shown for example in FIG. 9B). These variations can be beneficial for reducing a risk of damage to the electrical coupler resulting from passing heated fluid through the electrical coupler.

The electrical coupler is preferably formed from an electrically conductive material. The electrical coupler can be formed wholly or partially from electrically conductive material. In some variants, the electrical coupler can have an insulating material applied thereto, such as an applique or component fastened thereto.

The electrical coupler is preferably made of a refractory material (e.g., a semiconducting, electrically conductive, etc. refractory material), metal (e.g., refractory metal), and/or combination thereof (e.g., a cermet material). Preferred examples of electrical coupler materials include: carbon (e.g., graphite electrodes), silicon-carbide (e.g., silicon-silicon carbide, carbon-silicon carbide), tungsten carbide, molybdenum carbide, titanium carbide, vanadium carbide, chromium carbide, zirconium carbide, niobium carbide, molybdenum carbide, ruthenium carbide, rhodium carbide, hafnium carbide, tantalum carbide, tungsten carbide, rhenium carbide, osmium carbide, iridium carbide, platinum silicide, titanium silicide, vanadium silicide, chromium silicide, zirconium silicide, niobium silicide, molybdenum silicide, ruthenium silicide, rhodium silicide, hafnium silicide, tantalum silicide, tungsten silicide, rhenium silicide, osmium silicide, iridium silicide, neptunium silicide, titanium, vanadium, chromium, zirconium, niobium, molybdenum, ruthenium, rhodium, hafnium, tantalum, tungsten, rhenium, osmium, iridium, alloys or composites therebetween, and/or other similar materials. In some variations, the electrical coupler material can include dopants (e.g., metal dopants, p-type dopants, n-type dopants, etc.) to increase a conductivity of the electrical coupler.

The electrical coupler can be formed from a single continuous component, for example, as a continuous block of metal that is machined, molded, cast or otherwise shaped to possess the geometric features described herein. In various embodiments, electrical coupler can be formed from a single continuous component formed from any material as described herein. Electrical coupler can be configured to conduct electricity from one or more power interfaces due to the geometry and material of the device as well as allow fluid flow therethrough (e.g., by geometric considerations). The electrical coupler can additionally or alternatively be configured to couple to one or more external systems (e.g., inside or outside the reactor system) by nature of geometric features such as interfaces.

The catalytic element functions to drive (e.g., increase a reaction rate, decrease a reaction energy barrier, etc.) target chemical reactions. The catalytic element is preferably disposed between at least two electrical couplers (e.g., an anode and a cathode). However, a single electrical coupler (that acts as both cathode and anode) can be used (e.g., when an electrical path through the catalytic element passes through the majority of the volume of the catalytic element before connecting the anode to the cathode).

The catalytic element can be cylindrical, prismatoid (e.g., pyramidal, prismatic, antiprismatic, parallelepipedal, cupolaed, frustral, cube, rectangular prism, triangular prism, pentagonal prism, etc.), toroid (e.g., square toroid, rectangular toroid, hexagonal toroid, degenerate toroid, etc.), conical, and/or can have other suitable shapes (typically but not necessarily a 3D shape with two planar broad surface ends). Often the ends are antiparallel (e.g., opposing one another across an axis of the catalytic element). However, the ends can be orthogonal, parallel (e.g., U-shaped, V-shaped, chevron, boustrophedonic, zigzag, sinusoidal, serpentine, etc. with the ends in the same plane or otherwise having surface normal directed in the same direction), and/or can otherwise be related or have suitable structure. In some variants (as shown for example in FIG. 9D), electrical couplers can be configured to be bonded to the catalytic elements from the side rather than the ends.

The catalytic element can be partially formed from an electrically conductive or semiconducting material. In some variants, catalytic element can be formed wholly from electrically conductive or semiconducting material. In some variants, the catalytic element can be formed from an electrically conductive material with a catalytic material applied thereto.

The catalytic element can include: a substrate, a catalyst, and/or any suitable components. In some variants, the substrate can be formed from catalyst material (e.g., the substrate and catalyst can be the same).

The substrate functions to support the catalyst and/or heat the catalyst and/or fluid. The substrate can additionally or alternatively function to mix the fluid (e.g., by introducing turbulence into the fluid flow), increase a residence time of the fluid proximal the catalyst (e.g., by forming a tortuous pathway through the substrate), and/or can otherwise function.

The substrate is preferably formed from a refractory material, refractory metal, and/or combinations thereof (e.g., cermet). For instance, the substrate can be made from the same or a different material that the electrical coupler can be formed from (carbon, silicon-carbide, tungsten carbide, molybdenum carbide, titanium carbide, vanadium carbide, chromium carbide, zirconium carbide, niobium carbide, molybdenum carbide, ruthenium carbide, rhodium carbide, hafnium carbide, tantalum carbide, tungsten carbide, rhenium carbide, osmium carbide, iridium carbide, platinum silicide, titanium silicide, vanadium silicide, chromium silicide, zirconium silicide, niobium silicide, molybdenum silicide, ruthenium silicide, rhodium silicide, hafnium silicide, tantalum silicide, tungsten silicide, rhenium silicide, osmium silicide, iridium silicide, neptunium silicide, titanium, vanadium, chromium, zirconium, niobium, molybdenum, ruthenium, rhodium, hafnium, tantalum, tungsten, rhenium, osmium, iridium, alloys or composites therebetween, etc.). Other examples of substrate materials include oxides (e.g., titania, alumina, ceria, zinc oxide, zirconia, silica, etc.), nitrides, and/or other suitable materials (e.g., which may include dopants to modify the electrical properties of the substrate to promote uniform thermal and/or electrical distributions throughout the catalytic element).

The substrate preferably has a high specific surface area (e.g., to promote reaction sites) such as $\geq 1$ $m^2/g$, $\geq 10$ $m^2/g$, $\geq 100$ $m^2/g$, $\geq 1000$ $m^2/g$, and/or other surface area (e.g., BET surface area). However, the substrate can have any suitable specific surface area.

The substrate is preferably a porous material (e.g., a material with a porosity greater than 5%, a material with a solid material volume of at most 95%, etc.). For example, the substrate can be a foam (e.g., open-celled foam, stochastic foam, regular foam, etc.), a woven-fiber, periodic open cell structure, lattice, and/or can have any suitable structure. However, the substrate can additionally or alternatively be a solid material (e.g., mesh, ribbon, etc.), include engineered structures (e.g., a roughened surface to facilitate a large surface area), and/or can otherwise be formed.

The catalyst functions to reduce an activation energy of a target chemical reaction (e.g., increase a reaction rate, promote reaction centers, etc.). The catalyst is preferably disposed on (e.g., coated on, adhered to, absorbed on, adsorbed on, etc.) the substrate. Additionally or alternatively, the catalyst can be integrated into the substrate (e.g., where at least a portion of the catalyst material protrudes from the substrate material, can be disposed on the electrical coupler (e.g., to increase the total catalyst loading within the reaction module and/or reactor), and/or can otherwise be arranged.

Examples of catalyst materials (e.g., for the RWGS reaction) can include: oxides (e.g., iron oxide, chromium oxide, copper oxide, aluminium oxide, zinc oxide, cerium oxide, iron oxide, manganese oxide, indium oxide, nickel oxide, spinel oxides, solid solution oxides, perovskite-type oxides, composites or combinations thereof, etc.), metal catalysts (e.g., platinum, palladium, gold rhodium, ruthenium, copper, nickel, rhenium, cobalt, iron, molybdenum, etc.), phosphides (e.g., copper phosphide, nickel phosphide, tungsten phosphide, cobalt phosphide, molybdenum phosphide, combinations thereof, etc.), promoters (e.g., alkali metals, precious metals, bimetallics, etc.) and/or other suitable catalyst materials (e.g., for a specific reaction, combined with a specific substrate material, etc.).

The catalytic element and the electrical couplers can be connected mechanically (e.g., physically compressed together such as using a spring, pneumatic systems, hydraulic system, vacuum, motors, Belleville washer, etc.), chemically (e.g., using an adhesive such as carbon), and/or using any suitable connection mechanism.

The electrical coupler is preferably bonded to the catalytic element in a way that minimizes the electrical resistance (e.g., minimizes contact resistance or prevents high resistant phases from forming) and/or allows for the stable delivery of high current densities to the catalytic element. These bonding properties can provide a technical advantage as a high local resistance at the contact or contact interface can create hot spots and/or areas prone to degradation under reaction conditions. Local resistance can be minimized by using appropriate geometric design, materials selection, mechanical compression, chemical bonding, and other such processes that ensure intimate electrical and physical contact between the electrical coupler and the catalytic element (e.g., without adding stress such as during thermal expansion and contraction).

One exemplary method of bonding the catalytic element and the electrical coupler(s) includes using an interfacial adhesion layer applied to the ceramic substrate. For example, an adhesion layer is deposited on the SiC by any one of placement of foil at the interface, thermal spray, electroplating or chemical vapor deposition (CVD)/physical vapor deposition (PVD) with masking of remainder. Then any one of the following may be used to activate the adhesion layer to bond the catalytic element and the electrical couplers: induction heating, resistive heating, laser heating, and ultrasonic vibration.

Another exemplary method of bonding the catalytic element and the electrical couplers includes direct bonding through chemical bonding. For example, diffusion boding can be utilized. By physically placing components proximate to one another and applying a force (e.g., exceeding 100 MPa), followed by heating (e.g., up to or above about 2000° C.), a chemical bond can be induced between the two materials. Additionally, or alternatively, a precursor paste can be used by placing a mixture of Si, C and a binding agent at the interface followed by heating to elevated temperatures using any of the hating methods herein (induction, resistive, radiative, laser, vibration, etc.) to form a chemical bond.

Another exemplary method of bonding the catalytic element and the electrical couplers can include coating (e.g., with SiC) via CVD, liquid phase SiC, and/or other suitable approached.

Another exemplary method of bonding the catalytic element and the electrical couplers can include manufacturing (e.g., using additive manufacturing) the electrical coupler and element in one operation. Post-processing (e.g. silicon infiltration or other treatment) can then optionally be used (e.g., to further modify the relative conductivities of the couplers and the catalytic element).

Additionally, or alternatively, any component described in the entirety of the disclosure herein may be mechanically coupled via a wetted connection, brazing, diffusion bonding, ultrasonic welding or the like.

4. Specific Examples

Figure 1:
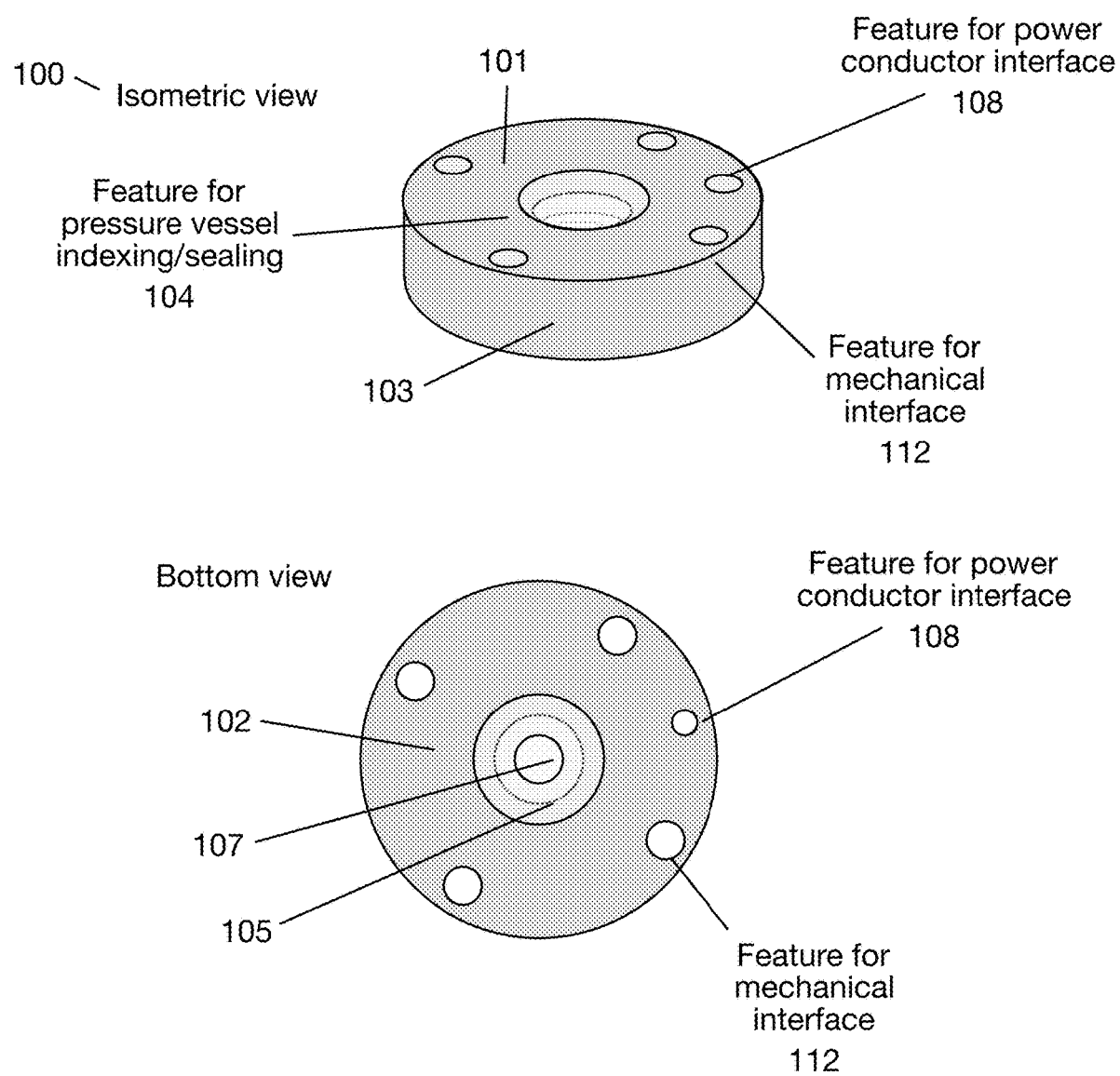
FIG. 1 is a perspective and planform representation of a schematic representation of an example of the electrical coupler.

The methods and systems presented herein may be used for an electrical coupler. The disclosed subject matter is particularly suited for an electrical coupler for a resistively heated reactor system. For the purpose of explanation and illustration, and not limitation, a first specific example of a system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures. However, reference numerals with different leading numeral can all refer to the same structure (e.g., from different perspectives, different variations of the same structure, etc.)

The first specific example can be used for an electrical coupler. The disclosed subject matter is particularly suited for an electrical coupler for a resistively heated reactor system. For the purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

FIG. 1 is a perspective and planform view of a schematic representation of the first specific example of the electrical coupler 100 for resistively heated reactor systems in accordance with the disclosed subject matter. A plurality of electrical couplers 100 may be operationally, functionally and/or physically similar or identical, thus reference to electrical coupler 100 may be made to describe one or both of the electrical couplers, or in some figures, every electrical coupler present in a reactor or system of reactors. Electrical coupler 100 may include a first end 101 and a second end 102, defining a thickness 103 therebetween. First and second ends 101, 102 may be any cross-sectional shape. For example, and without limitation, the first and second ends may have a circular cross-sectional shape, thereby forming a cylindrical electrical coupler 100 with two planar, normal circular faces as termini on either side of thickness 103. In various embodiments, first end 101 and second end 102 may have a rectilinear cross-sectional shape, oblong cross-sectional shape, or any polygonal cross-sectional shape. First end 101 and second end 102 may be parallel to one another, having a normal circular outer wall extending therebetween forming a right cylindrical electrical coupler 100. For example, and without limitation, electrical coupler 100 may have non-parallel first and second ends 101, 102. For example, and without limitation, first end 101 and second end 102 may have surface features, such as ridges, ribs, rings, waves or other protrusions on the surface thereof. For example, and without limitation, the cylindrical wall extending between the first end 101 and the second end 102 may be angled, scalloped or include features such as bottlenecks, undulations, corrugations or the like. In various embodiments, first end 101 may be a different cross-sectional shape than second end 102. In various embodiments, first end 101 may be the same or similar cross-sectional shape but a different size than second end 102, thus forming a conical or conical sectional shape of electrical coupler 100.

The first specific example of the electrical coupler 100 may have an interface 104 within the first end 101. Interface 104 may be formed as one or more countersinks that have the same planform shape as the end in which it is sunk. For example, a circular end may have a circular interface 104 disposed therein. Interface 104 may have a countersink bottom of a similar or the same shape as interface 104, for example, interface 104 may have a circular bottom. Interface 104 may include internal geometrical features such as ridges, ribs, or radial features such as shoulders and necks. Interface 104 may form a first interface with one or more sealing features therein. Similarly, second end 102 may have a second interface 105, second interface 105 may be a mirror image of interface 104. In various embodiments, the countersinks of interfaces 104, 105 are different planform shapes, for example, first interface 104 may be a circular bore into the radial center of the first end 101 and second interface 105 may be a square bore into the radial center of the second end 102. In various embodiments, each of the countersinks may be bored a different depth, for example, first interface 104 may be deeper than second interface 105. Interface 104 and/or 105 may be an interface for sealing against a pressure vessel as described herein. In various embodiments, interface 104 and interface 105 may be concentrically formed in the same end of electrical coupler 100.

For example, and without limitation, interfaces 104 and 105 may be radially centered with the electrical coupler 100 and have at least one opening 107 therethrough, thus connecting the first end 101 and the second end 102 or facilitating fluid flow therethrough. In various embodiments, the opening 107 may be radially centered and bored normally to electrical coupler 100. The at least one opening 107 may be made at the bottom most portion of each of the interfaces 104 and 105. In various embodiments, the opening 107 may be formed during the countersink fabrication process. In various embodiments, the at least one opening 107 is a borehole formed normally to the first end 101 and the second end 102, the at least one opening 107 having a diameter of approximately 0.5 to 10 centimeters.

In variations of the first specific example, the at least one opening 107 is a plurality of openings formed from the first end to the second end, each of the plurality of openings having a diameter of approximately 0.01 to 1 centimeter (cm). In variations of the first specific example, the plurality of openings 107 are formed in a ring disposed concentrically with a normal axis extending from a center of the first end 101 to a center of the second end 102. The mechanical design of the electrical coupler ideally allows for even fluid flow through the assembly and may need to distribute fluid evenly prior to entry into the catalytic heating element. When fluid is not evenly distributed across the electrical coupler prior to entry into the catalytic element, the efficiency of the element may be significantly reduced. In variations of the first specific example, the plurality of openings 107 may be formed normally to one or both of the first end 101 and the second end 102. In variations of the first specific example, a first portion of the plurality of openings may be oriented normally with one or both of the first end 101 and the second end 102 and a second portion of the plurality of openings 107 may be formed at an angle thereto. In variations of the first specific example, electrical coupler 100 can be formed from a structure having a plurality of randomly aligned holes and channels, akin to foam, cork, or a sponge. In variations of the first specific example, at least one opening 107 is formed in the electrical coupler 100 as a plurality of channels and/or pores.

With continued reference to FIG. 1 and variations of the first specific example, electrical coupler 100 may have a power interface 108 formed therein. The power interface 108 may be formed or emplaced on one of the first end 101 (as shown) and extend through to the second end 102 (as shown). In various embodiments, the power interface 108 may be formed on the surface of the first end 101, second end 102 or thickness 103, exclusively. In variations of the first specific example, power interface 108 may be emplaced or formed integrally with the electrical coupler 100. In variations of the first specific example, the power interface 108 may be configured to couple to one or more wires or conduits configured to provide electrical energy to the electrical coupler 100. In variations of the first specific example, the voltage drop and heat generation from the electrical connection may be utilized as fluid flow pre-heat system (e.g., using a resistive material as an electrical contact may preheat the fluid flow prior to entering the pressure vessel for catalysis).

With continued reference to FIG. 1 and variations of the first specific example, electrical coupler 100 may have a mechanical interface 112. Mechanical interface 112 may be formed or emplaced on one of the first end 101 (as shown) and extend through to the second end 102 (as shown). In variations of the first specific example, the mechanical interface 112 may be formed on the surface of the first end 101, second end 102 or thickness 103, exclusively. In variations of the first specific example, mechanical interface 112 may be emplaced, machined, bored, carved, cut or formed integrally with the electrical coupler 100.

In variations of the first specific example, the mechanical interface 112 can be configured to accept a threaded rod therein. For example, and without limitation, a portion of mechanical interface 112 can be threaded such that a rod can be inserted with a portion exposed such that a nut, washer, pin or other retainment component can be threaded or coupled thereto. In variations of the first specific example, mechanical interface 112 may be configured to press fit with another component, such as a rod. In variations of the first specific example, mechanical interface 112 can be disposed radially about a central axis of the electrical coupler 100 at regular intervals. In variations of the first specific example, mechanical interface 112 can include a plurality of mechanical interfaces 112 of the same or different type. For example, and without limitation, mechanical interface 112 can be one or more slots configured to retain a hook or other boss, thereby holding any component stationary relative to electrical coupler 100. For instance, and without limitation, mechanical interface 112 may be adjustable or adjusted. For instance, the threaded rod may be rotated to tighten or loosen any two components relative to the electrical coupler 100. For instance, mechanical interface 112 may facilitate a seal between two components by tightening via rotation of a threaded rod.

As a second specific example (that can be the same as and/or integrated with the first specific example and variations thereof with potential design modifications), the electrical coupler 100 is shown as a side view and planform view (e.g., as shown in FIG. 2). As can be seen in FIGS. 1 and 2A-2D, interface 105 can be an interface for one or more fluid supply lines, such as a fluid inlet or fluid outlet. In variations of the second specific example, interface 105 may include threads or another retainment feature configured to couple and seal a component carrying a fluid such as a gas to the electrical coupler 100 and provide gas through the at least one opening 107. In variations of the second specific example, the electrical coupler can be fluidically and electrically conductive and stable at high temperature (e.g., ≥500° C., ≥900° C., etc.) in corrosive environments.

Figure 2A:
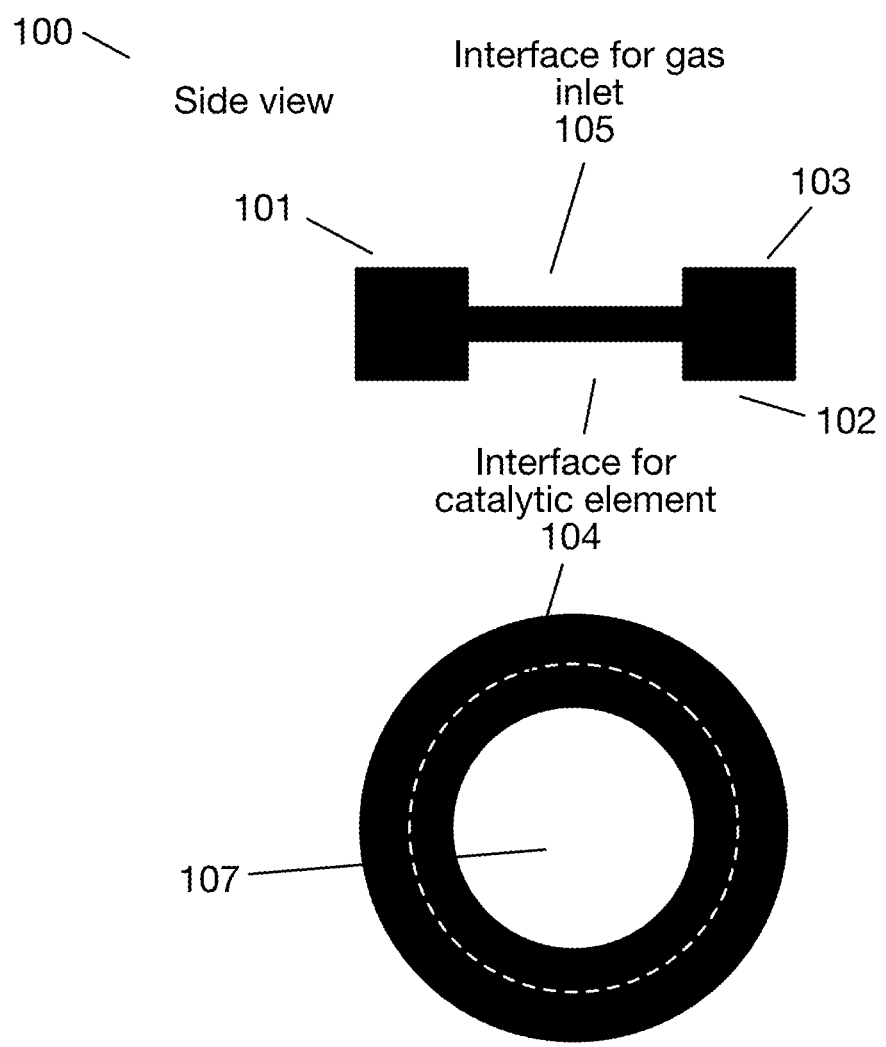
FIG. 2A-2D are schematic representations of various embodiments of the electrical coupler for resistively heated reactor systems.

With continued reference to FIG. 2A and in variations of the second specific example, second interface 105 is shown in section view and with phantom line. The second interface 104 can form a second interface for a catalytic element (to be described herein below) and/or a pressure vessel. The second interface (104) can include any number of geometric or materials features such as internal shoulders and rubber gaskets to form a bond with electrical coupler 100 (and seal the connected).

Figure 2B:
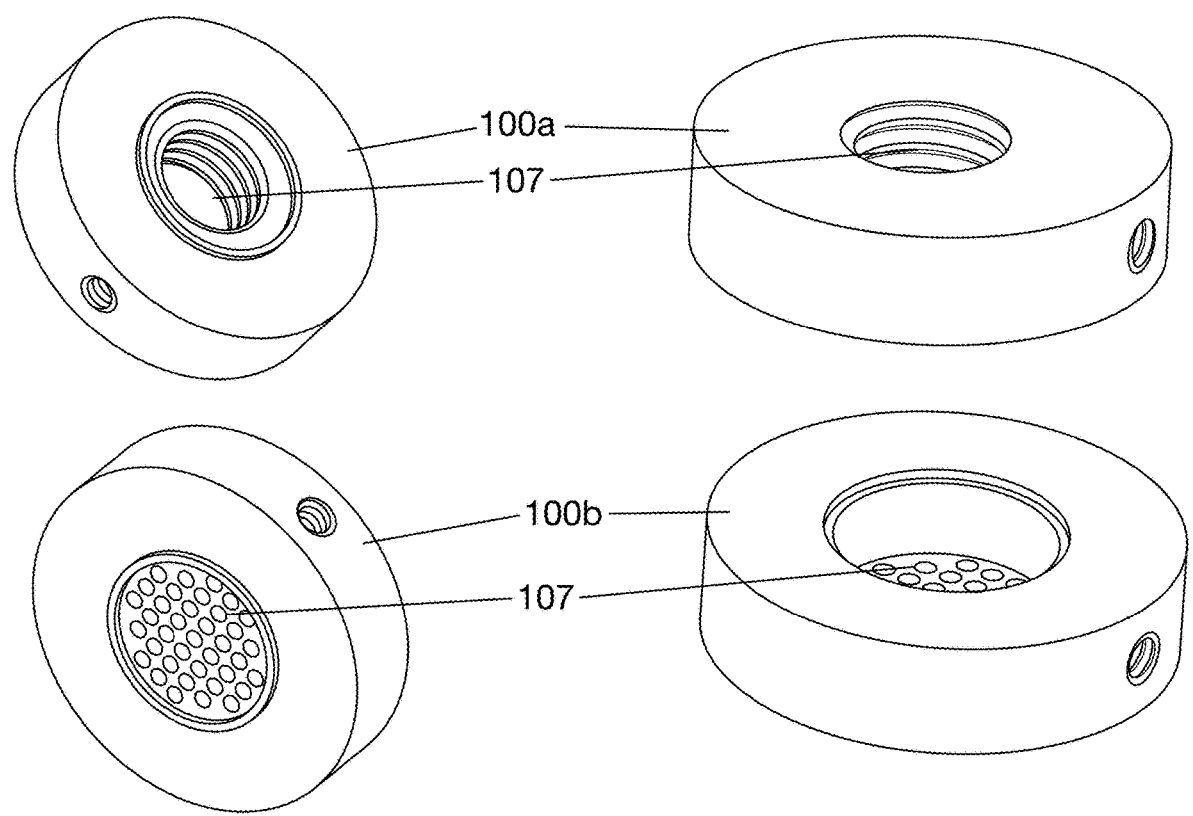
Figure 2C:
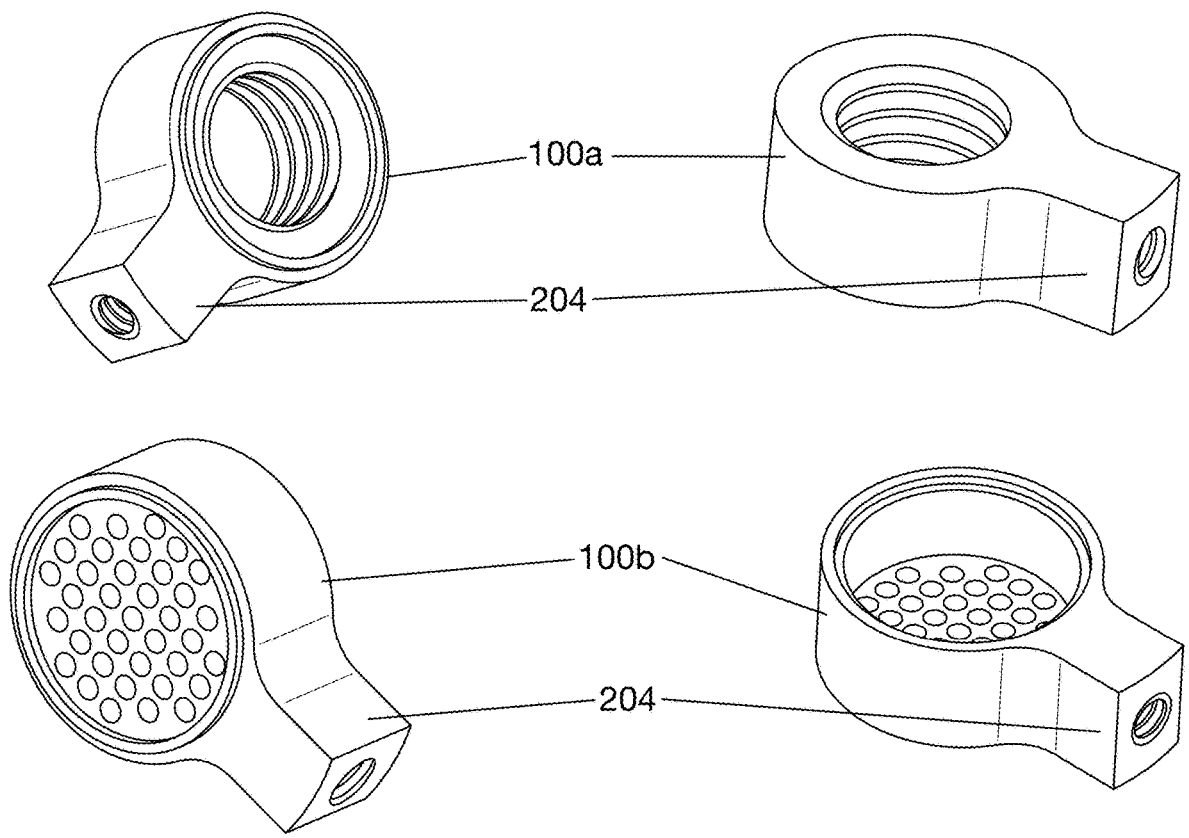
Figure 2D:
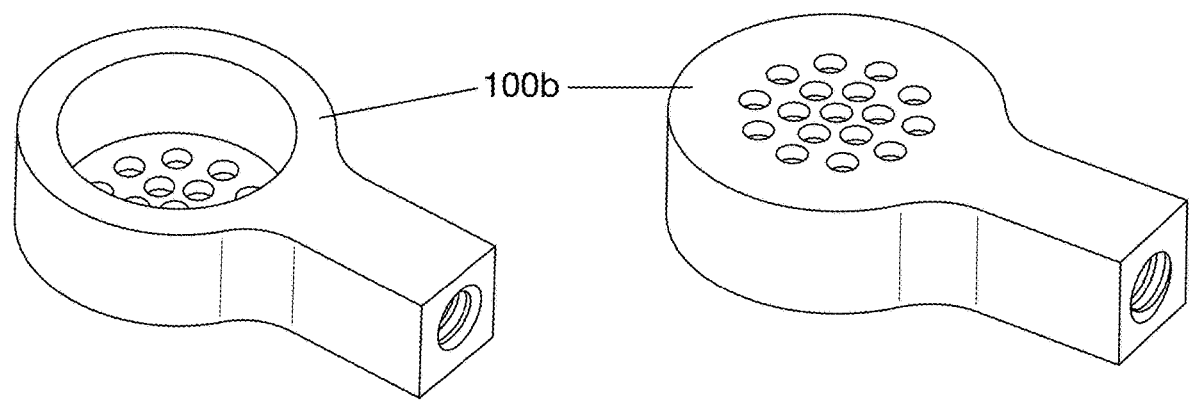

Referring now to FIG. 2B-2D, variations of the electrical coupler of specific example 1 or 2 100a and 100b are shown in isometric views. In various embodiments, electrical couplers 100 can be the same on either end of the catalytic element, secured thereto through the same or similar mechanism. In various embodiments, electrical coupler 100a may configured separately than electrical coupler 100b. For example, and without limitation, electrical coupler 100a electrical can be configured to couple to the catalyst or heater element through a compressional set screw connection. However, other suitable fastening mechanisms can be used (e.g., springs). Electrical coupler 100 can have an opening 107 configured to allow for fluid flow therethrough. Opening 107 can be threaded and configured to receive a set screw, the set screw rotating to compress and form an electrical contact with the catalytic element. Additionally, or alternatively, electrical coupler 100b can be configured to have an opening 107, the opening 107 having a plurality of smaller openings disposed therein. The opening 107 in electrical coupler 100b may be configured to circumscribe the catalytic element and form a mechanical bond therebetween.

In some variations of the electrical couplers 100a and/or 100b (as shown for example in FIG. 2C or FIG. 2D) can have an asymmetrical stand-off 204. The stand-off 204 can have a threaded hole therein and formed parallel to the stand-off 204. The (optionally threaded) hole can be configured to form an electrical connection with one or more power interfaces as described below, for example a wired power connection or the like. In various embodiments, stand-off 204 may be configured for electrical coupling in a plurality of methodologies, for example soldering or bolt-on to an electrical lead. The threaded stand-off 204 can be configured to be screwed in a power conductor, wherein the power conductor is sealed to the reactor vessel via a feedthrough, which separates the vessel from ambient atmosphere. In various embodiments electrical couplers 100a, 100b can be configured to be bonded to the catalytic element. The radial symmetry of the counter-sink and the backstop with a plurality of holes can be configured to match the geometry of any catalytic elements.

Figure 3A:
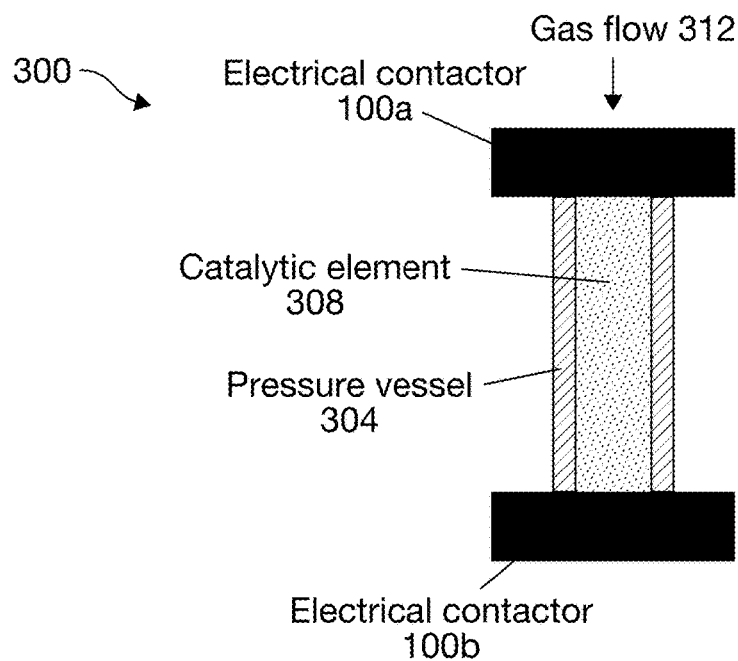
FIG. 3A is a schematic representation of an exemplary reactor utilizing an electrical coupler.

As a third specific example (e.g., of a reactor 300 such as shown for example in FIG. 3A), the reactor can utilize an electrical coupler 100 for resistively heated reactor systems. Reactor 300 can include an electrical coupler 100 (or substantially similar conductor, electrode, contactor, etc.) disposed at a distal end and a proximal end thereof. Reactor 300 can include a pressure vessel 304. Pressure vessel 304 can have a first circular end and a second circular end, with a cylindrical wall circumscribed about the perimeter of each and extending therebetween to form a cylindrical vessel. However, the pressure vessel can have a prismatic shape, toroidal shape, and/or other suitable vessel structure can be used. The pressure vessel 304 can be seated within the countersinks (105) of each of the electrical couplers 100a, 100b. The pressure vessel 304 can be sealed against the electrical couplers 100a, 100b (e.g., via one or more O-rings, gaskets, knife-edge seals, etc.). In various embodiments, the pressure vessel 304 can form a press fit with one or both of the electrical couplers 100a, 100b. In various embodiments, the pressure vessel 304 can be configured to not allow ingress or egress of a fluid, such as gas or liquid flow 312, through the walls thereof. The pressure vessel can be formed, for example, from quartz crystal and/or other suitable materials that are resilient to the reaction conditions within the reactor. The pressure vessel 304 can be coupled to one or both of the electrical couplers 100a, 100b via chemical bonding or adhesion, can be integrally formed with the one or both of the electrical couplers 100a, 100b, can be mechanically coupled to one or both of the electrical couplers 100a, 100b, and/or can otherwise be configured.

In various embodiments, pressure vessel 304 can have a sealing feature at the first circular end and second circular end configured to matingly couple with a corresponding feature of the first and second electrical couplers 100a, 100b. For example, the rim of the pressure vessel 304 can seat within a circular channel formed within the countersink of the electrical coupler 100a or 100b. In various embodiments, the pressure vessel can be configured to accept a flowing fluid entering said vessel from the opening in the electrical coupler 100a and conduct said fluid flow 312 through the second electrical coupler 100b (e.g., via the catalytic element). In various embodiments, $H_2$-stable and carburization-resistant materials can be utilized to create the weldment and any or all reactor seals.

In various embodiments, one or both of first electrical coupler 100a and second electrical coupler 100b can have a power interface (e.g., as described in reference to the first specific example). In various embodiments, one or both of first electrical coupler 100a and second electrical coupler 100b can have a mechanical interface or plurality thereof (e.g., as described in the first or second specific example). In various embodiments, each of the electrical couplers 100a, 100b can have corresponding mechanical interfaces such as fastener interfaces, configured to couple the reactor 300 together. For instance, at least one threaded rod can extend from the first electrical coupler 100a to the second electrical coupler 100b, parallel and exterior to the cylindrical wall of pressure vessel 304, the threaded rod configured to compress and couple the reactor 300 components. In various embodiments, first electrical coupler 100a, second electrical coupler 100b, and pressure vessel 304 may be formed as concentrically and serially disposed cylinders. For example, pressure vessel 304 may have a smaller diameter than each of electrical couplers 100a, 100b. In various embodiments, pressure vessel 304 may have the same diameter as one or both of electrical couplers 100a, 100b. In other embodiments, pressure vessel 304 may have a larger diameter as one or both of electrical couplers 100a, 100b with the couplers and catalytic element contained within the pressure vessel.

In the third specific example, the reactor 300 can include a catalytic element 308. Catalytic element 308 is sealably (e.g., hermetic seal, fluidic seal, etc.) disposed within the pressure vessel 304, the catalytic element in electrical contact with the electrical couplers 100a, 100b. In various embodiments the catalytic element 308 is in direct electrical contact with each of the electrical couplers 100a, 100b. In various embodiments, the catalytic element is in indirect electrical contact with the electrical couplers 100a, 100b. The catalytic element 308 can radially contact (e.g., electrical coupler 100 can circumscribe the sides of the catalytic element 308 to allow for unobstructed fluid flow 312), axially contact (e.g., electrical coupler 100 can be attached to the ends of the catalytic element 308 to allow for fluid flow 312 through the couplers and catalytic element, where fluid flow can occur radially or orthogonally to the electrical couplers, etc.), and/or can other contact the electrical coupler 100a or 100b. In various embodiments, one or more components can optionally be included and configured to facilitate electrical communication between the electrical couplers and the catalytic element, such as compressive elements like washers, metal foams and the like. In various embodiments, the electrical couplers 100a, 100b have a matched thermal expansion coefficient to the catalytic element 308 and forms a low-resistance contact with the catalytic element. The resistance of the electrical couplers is preferably lower than that of the catalytic element 308 (so that the catalytic element is the primary site of heating), though this is not strictly necessary. As a specific embodiment, catalytic element may be 3-6 inches in wide and 6-12 inches long; however, other suitably dimensioned materials can be used.

In the third specific example, the reactor 300 can be arranged such that the electrical couplers 100a, 100b provide for unobstructed fluid (e.g., gas flow) flow 312 through to the catalytic element 308 within the pressure vessel 304, to provide for current flow to resistively heat the cell, and to provide a sealing surface for the pressure vessel 304. Reactor 300 can optionally include one or more thermocouple emplaced therein, each configured to measure the temperature in a localized or larger portion of reactor 300. The pressure vessel 304 can be formed from one or more insulating materials configured to improve thermal efficiency of system while maintaining an optimal fluid flow 312 profile. In various embodiments, pressure vessel 304 may interlock with one or both electrical couplers 100a, 100b to form a seal against fluid flow 312.

Figure 3B:
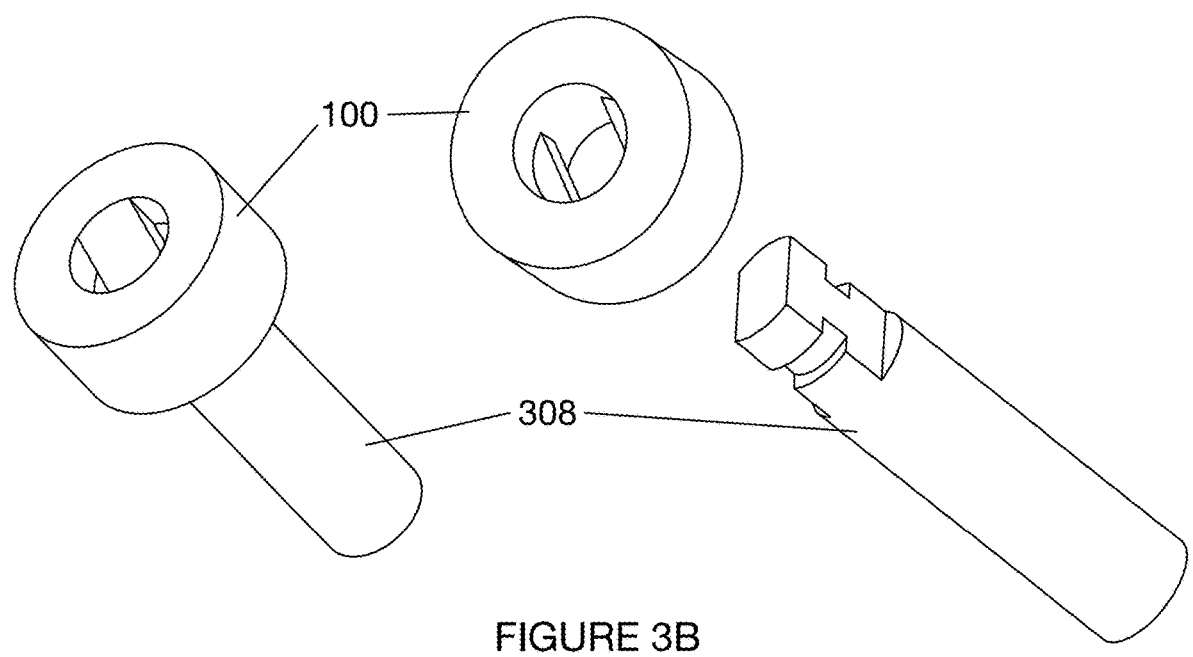
FIG. 3B is a schematic representation of an example of a mechanical interlock between an electrical coupler and a catalytic element.

In a specific example (as shown for example in FIG. 3B), a mechanical interlocking bond between electrical coupler 100 (which may be one or both of electrical couplers 100a, 100b) and catalytic element 308 can be used. The electrical coupler 100 and catalytic element 308 can have corresponding geometric features configured to be brought into contact to form a mechanically interlocking bond (e.g., via twisting, via tight manufacturing tolerances, via mating structures, etc.). In various embodiments, the electrical coupler 100 can have a circular opening 107 in the axial center thereof, opening 107 having two linear bosses forming segments of the opening 107 defined by the linear chords. The segments can be formed from the same material as the electrical coupler 100. In various embodiments, the segments can be formed from a different material than the electrical coupler 100. In various embodiments, the segments can be integrally formed or affixed after fabrication of the electrical coupler 100. Correspondingly, the catalytic element 308 can be formed with a prismatic end portion configured to enter the opening 107 between the segments. Then the catalytic element 308 can be rotated (or otherwise mated), capturing the segments of the electrical coupler 100 in matingly-formed cutouts in the prismatic end of the catalytic element 308. The segments can be configured to retain the catalytic element 308 in the axial direction of the electrical coupler 100. This mechanically interlocking technique is only illustrative and not intended to limit the types of mechanical bonding between components described herein.

Figure 3C:
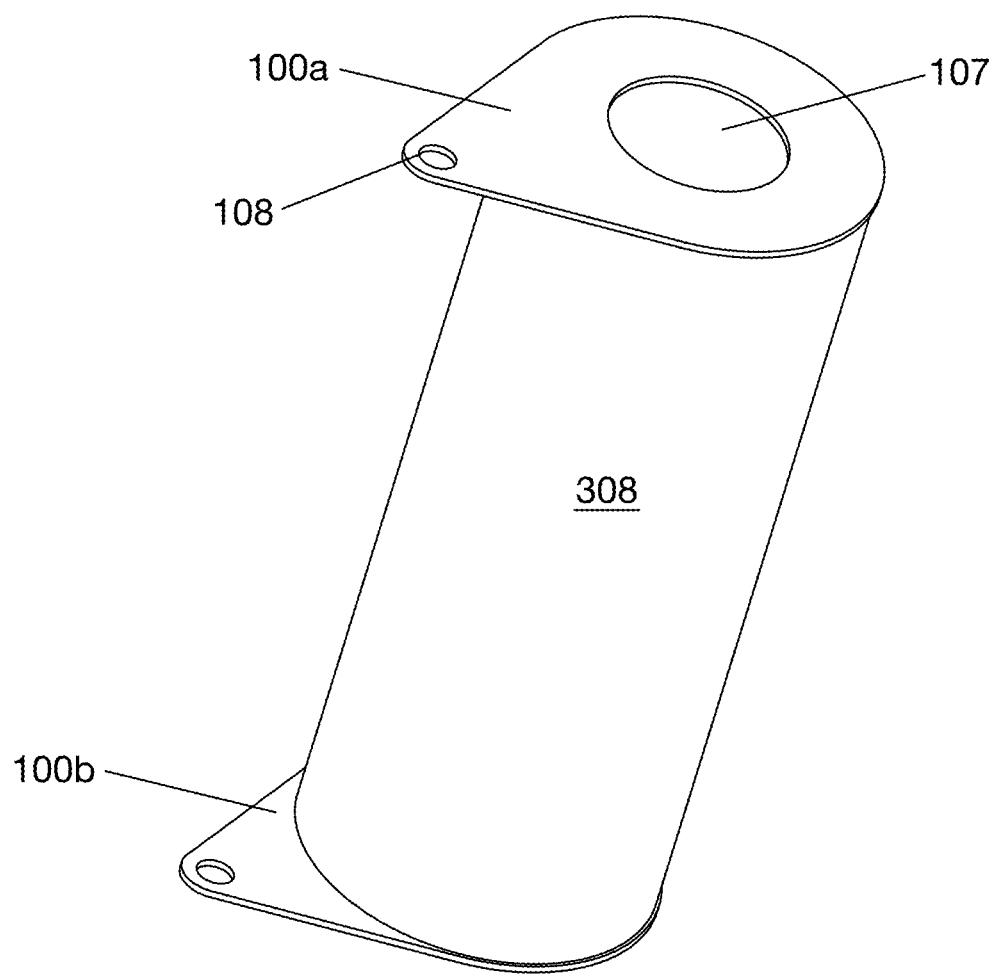
FIG. 3C is a schematic representation of an exemplary interface between electrical couplers and a catalytic element.

A specific example of an interface between electrical couplers 100a, 100b and catalytic element 308 is shown in FIG. 3C. Electrical couplers 100a, 100b can be formed as generally planar components with an arcuate section that is sized to the end of catalytic element 308. For example, catalytic element 308 can have a circular end shape, so electrical couplers 100a, 100b can have generally circular portion to abuts thereto. Electrical couplers 100a, 100b can have a tab portion that extends linearly from the center of the arcuate portion, the tab portion configured to receive one or more electrical connections, such as alligator clips, bolt-on coupling or the like. In various embodiments, the tab portion can be formed as a generally triangular section. In various embodiments, the tab portion can be any shape that extends away from the end of the catalytic element 308 to couple an electrical connection thereto. In various embodiments, tab portion can have power interface 108 emplaced thereon, for example as an opening sized to receive an electrical cable. In various embodiments, the tab can be a feature (rod-like, plate-like, or of any other shape) that extends away from the catalytic element sufficiently to mate with external power conductors in a region of the system that is of significantly lower temperature (a "cold-zone"), such as to enable mating to more highly conductive power feedthroughs that are not able to withstand the catalytic conditions close to the element (a "hot-zone").

Figure 3D:
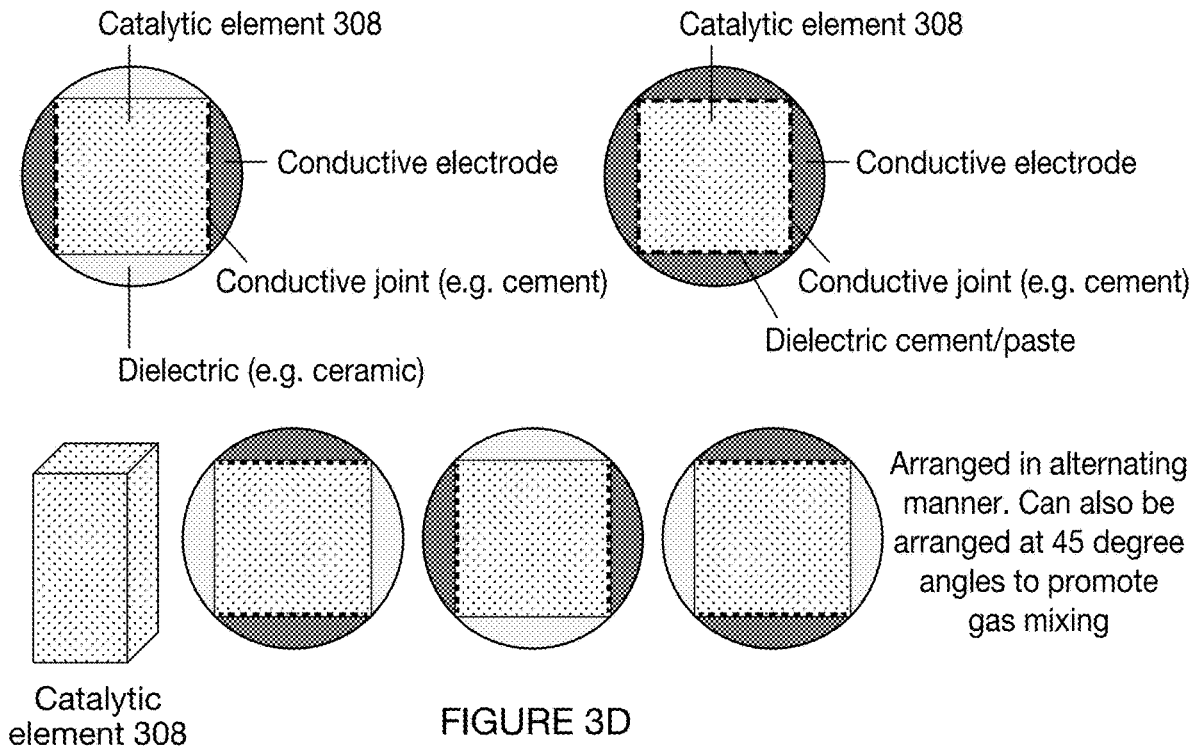
FIG. 3D-3F are schematic representations of exemplary electrical coupler and catalytic element interfaces.

In one specific example, catalytic element 308 may be formed as a rectangular prism (as shown for example in FIG. 3D), having an approximately square cross section. Machined carbon (or other suitable electrical coupler material) can form an electrode and be bonded to the side of the prismatic catalytic element (e.g., by conducted cement, which may also be formed from carbon). These electrodes can be bonded to the catalytic element 308 on opposite sides, sandwiching the element therebetween. Additionally, or alternatively, on the two other sides of the catalytic element, machined alumina may be bonded to the catalytic element 308. The alumina may be utilized for its electrically insulative and thermally conductive properties. Additionally or alternatively, all sides (e.g., faces) of the catalytic element 308 can be bonded to the electrodes, a subset of sides (such as opposite sides) can be bonded using conductive carbon cement and the other pair of sides can be bonded using alumina cement or alumina paste, and/or other suitable binding mechanisms can be used on other suitable surfaces (e.g., sides).

Figure 3E:
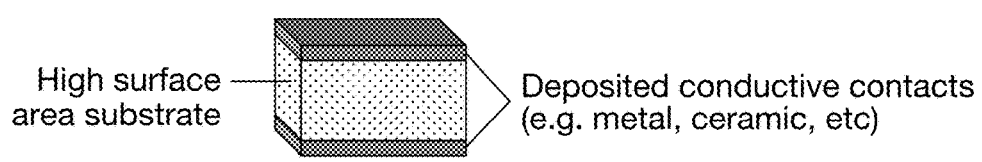
Figure 3E:
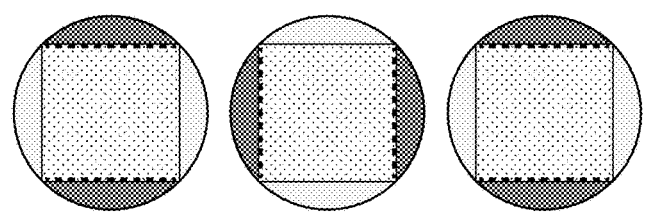

In a specific example a catalytic element 308 may be formed from a foam substrate (as shown for example in FIG. 3E in perspective and planform views). Said foam substrate can be formed from one or more metals, refractory materials (e.g., ceramics), combinations thereof, and/or other suitable material(s). The foam catalytic element 308 can be subject to thermal spray coatings (e.g., nickel, Hastelloy, etc.) on at least one side. The thermal spray coating may be applied on any side of catalytic element 308, including opposite and opposing sides, or any arrangement with electrical insulators.

Figure 3F:
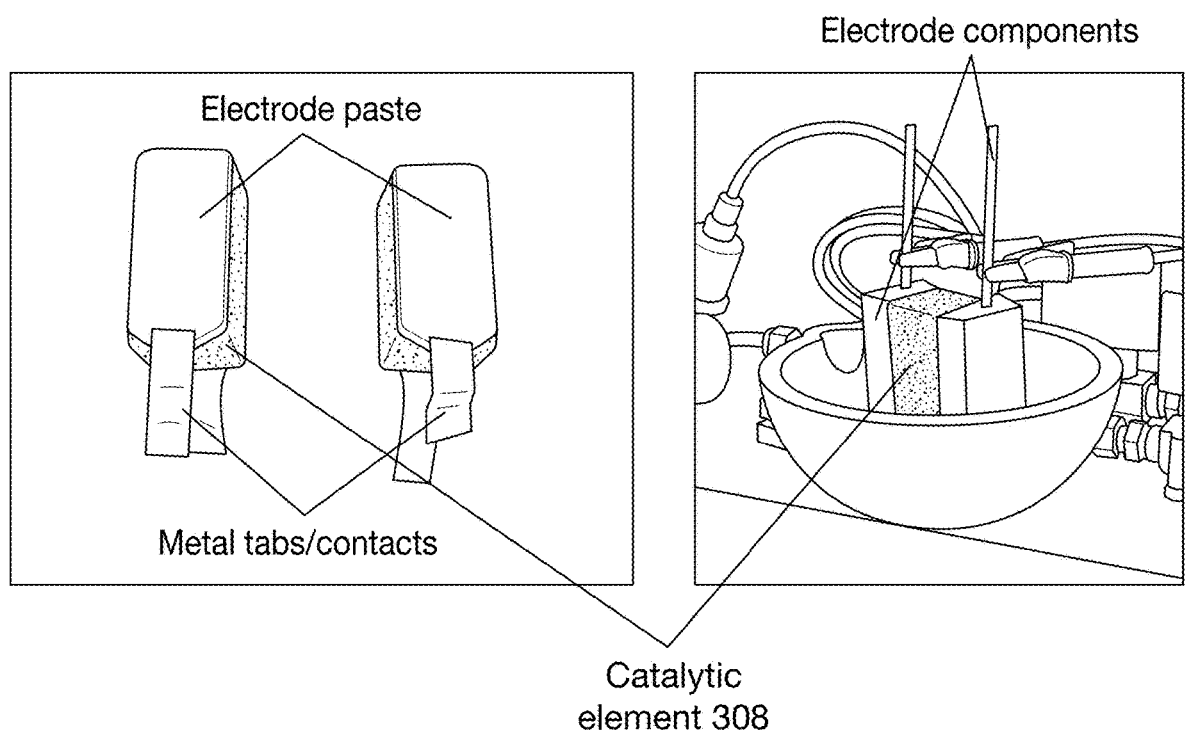

In a specific example (as shown for instance pictorially in FIG. 3F), catalytic element-electrode assemblies (e.g., reaction modules) can include paste (e.g., carbon, silicon carbide, etc.) applied to the catalytic element 308 to bond tabs (e.g., nickel tabs) to opposite and opposing sides. The tabs may be formed in any shape or dimension, here shown as foil having a rectangular planform shape. Said catalytic element 308 can be formed as a rectangular prism having generally planar sides. On the opposing side, the catalytic element 308 can be bonded to graphite components using any of the paste/cements described herein. The graphite components may have integrally formed or affixed tabs for electrical connection via clamps, in various embodiments.

In these specific examples (e.g., the first second or third specific example) the electrical couplers 100a, 100b can have features that allow for the interaction with other external or internal systems as described above (as shown for example in FIGS. 4A-4F). These features can be used to interact with external power supply lines (such as power interface 108), insulating components, fluid flow 312 components, mechanical interface 112 features (e.g., for the stability of system), and/or other such systems. These features can also provide sealing surfaces for pressure vessels 304, insulating jackets, and/or other components. In various embodiments, one or more insulating jackets can be emplaced or coupled around the reactor 300. In various embodiments the insulating jackets can be electrically and/or thermally insulating. In various embodiments, the insulating jacket can include structural components configured to couple, retain, or stabilize at least a portion of the reactor 300. In various embodiments, the insulating jackets can be either internal or external to the pressure vessel and can act to electrically isolate various sub-components of the reactor system.

Figure 4A:
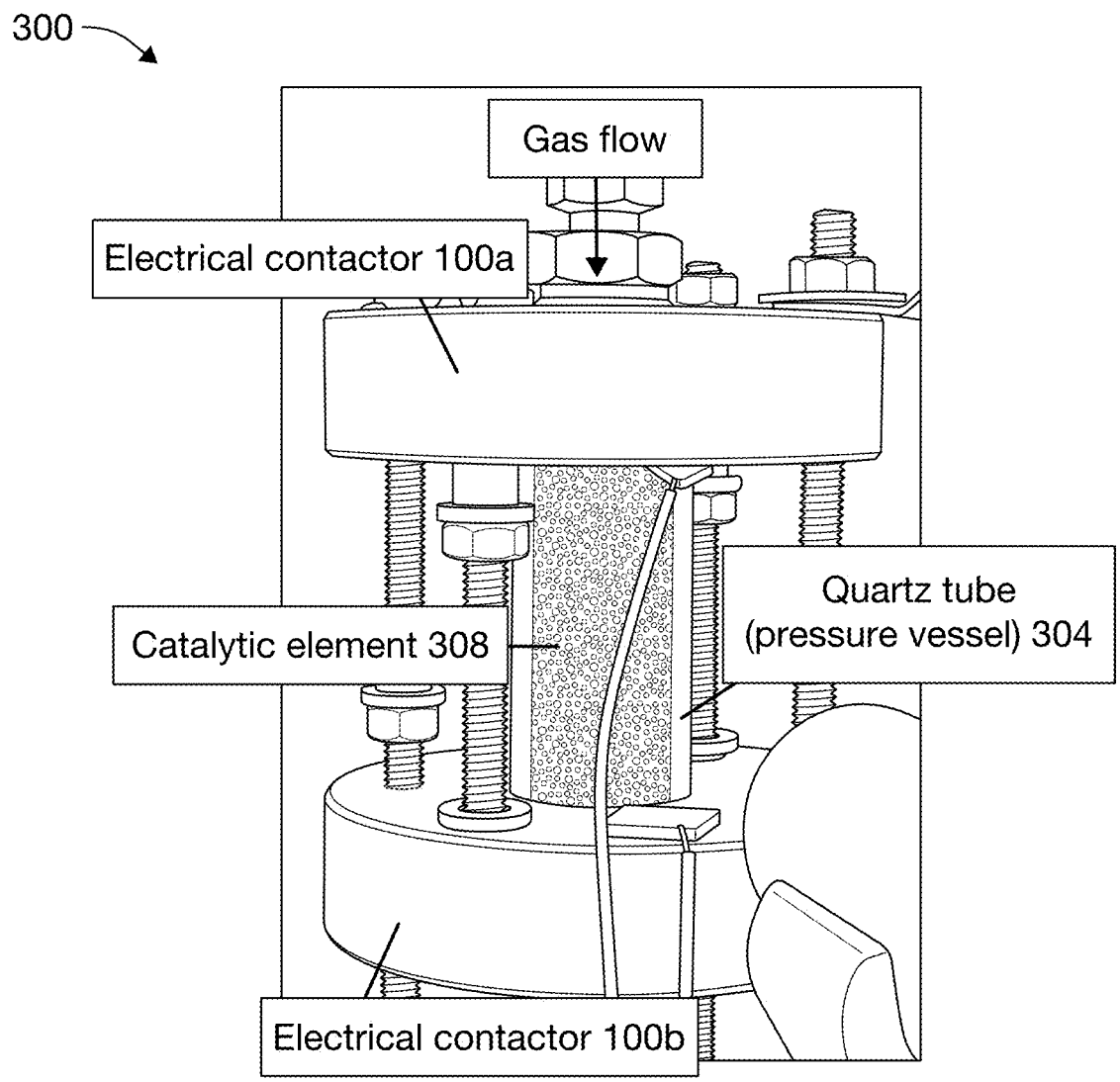
FIG. 4A-4G are representations of several exemplary contact types of electrical couplers.
Figure 4B:
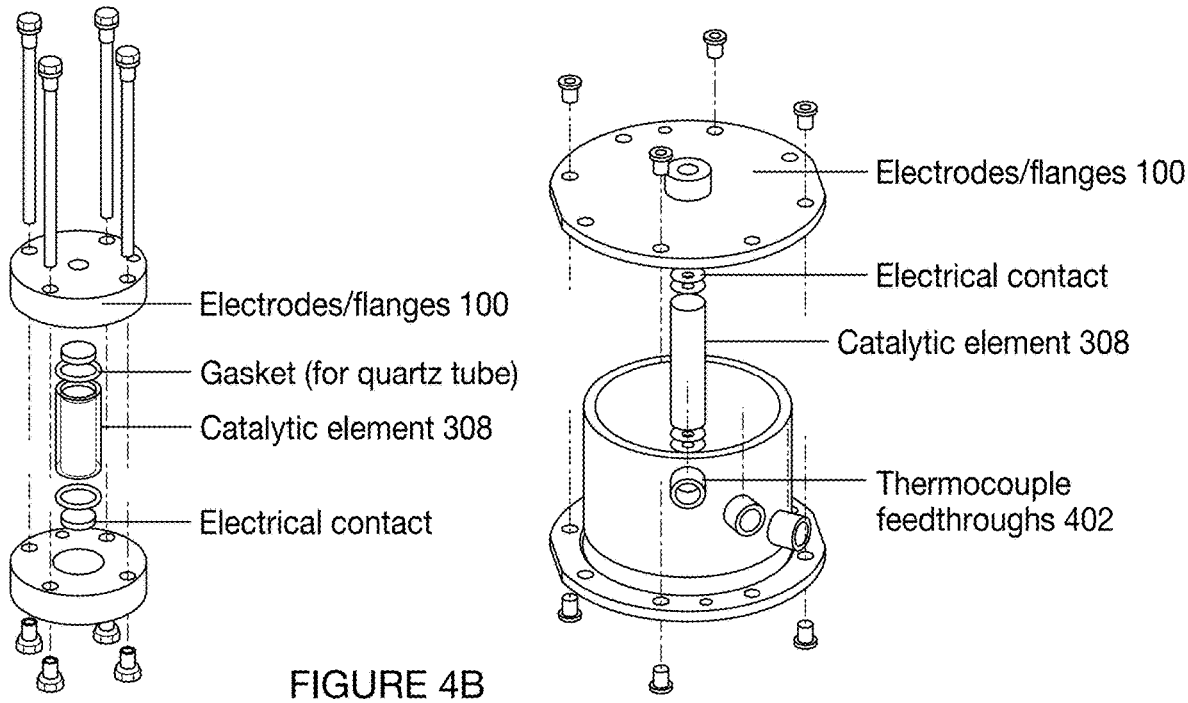
Figure 4C:
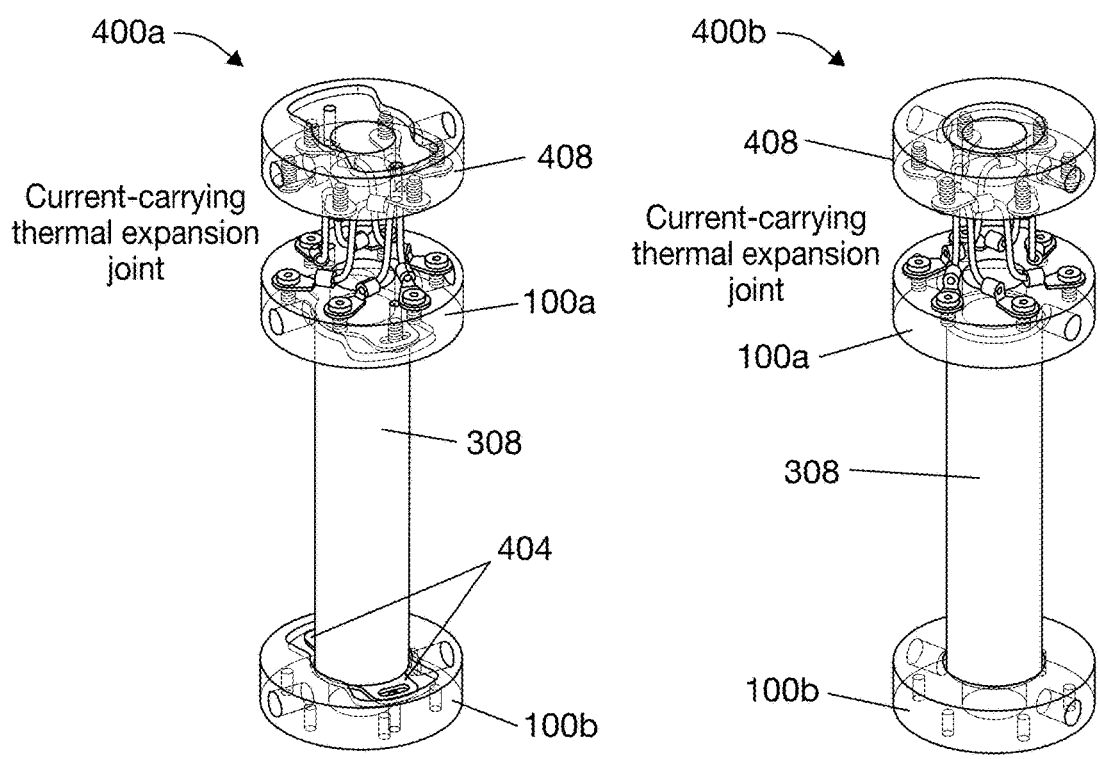
Figure 4D:
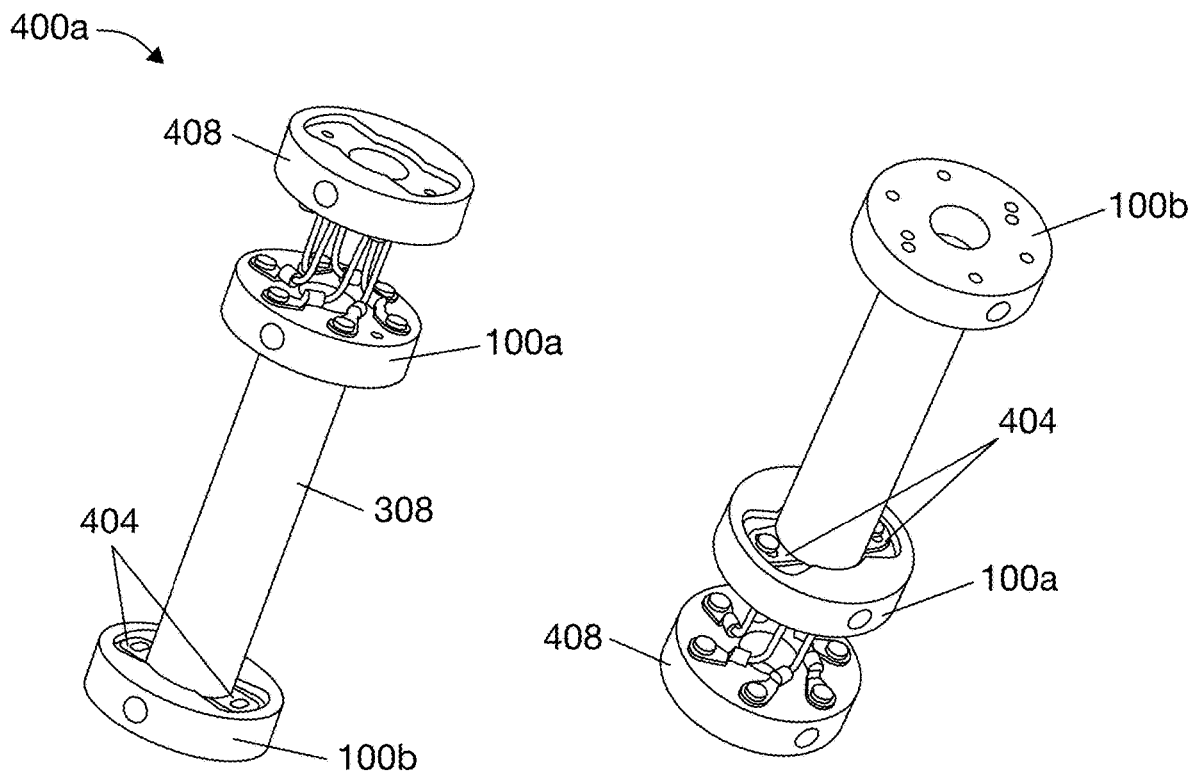

In a specific variation of the third specific example, the reactor 300 can be mechanically connected by threaded rods extending from electrical couplers 100a, 100b (as shown for example in elevation views in FIG. 4B). The electrical couplers can have corresponding holes where a straight rod can be seated within both couplers and extend therebetween, the couplers fastened to the rods. The electrical contacts can be any as described herein, for example a metallic foam, a washer, spring or the like. Reactors 300 can include gaskets configured to form a seal between the electrical couplers 100 and the pressure vessel 304. There can be a space (e.g., annular space) between the catalytic element 308 and the pressure vessel 304, or insulation jacket. In various embodiments, the pressure vessel and/or insulation jacket can have thermocouple feedthroughs 402 disposed therein, configured to receive a thermocouple an allow for electrical coupling exterior to the reactor 300. In other embodiments, the space may be filled by inert, insulating media to limit gas bypass around the catalytic element.

In some variations of examples of the rector 400a (as shown for instance in the elevation view of FIG. 4C) can utilize a bolted-on tab coupling between the electrical couplers 100a and the catalytic element 308. The tabs 404 can be formed from tungsten (or other refractory metals, refractory material, combinations thereof, etc.) and have an opening formed therein (e.g., configured to receive a bolt or mechanical fastener to form a bond to the electrical couplers 100a, 100b). The tabs 404 may have slots, holes or a combination thereof formed therein to receive a correspondingly shaped mechanical fastener therethrough. In various embodiments, the tabs 404 can be bonded to the catalytic element using any suitable bonding techniques. In various embodiments, the tabs 404 can be formed from any electrically conductive material. Reactor 400b can have electrical couplers 100a, 100b mechanically or chemically (or both) bonded to the catalytic element 308 as described herein. The electrical coupler 100a, 100b can, for instance, be partially or wholly formed from graphite. In various embodiments, reactors 400a, 400b can have a graphite-based current-carrying thermal expansion joint 408 configured to maintain electrical connection between the electrical couplers and the catalytic element during thermal expansion. The thermal expansion joint 408 can include one or more wires and/or other electrical connections configured to move and maintain the electrical connection during movement of the components, such as electrical coupler 100a and/or catalytic element expansion and/or contraction. In various embodiments, thermal expansion joint 408 can be configured to deliver electric current to the coupler 100a via the discreet connections, the connections radially spaced about coupler 100a to provide for even heating and even expansion of the coupler 100a.

Figure 4E:
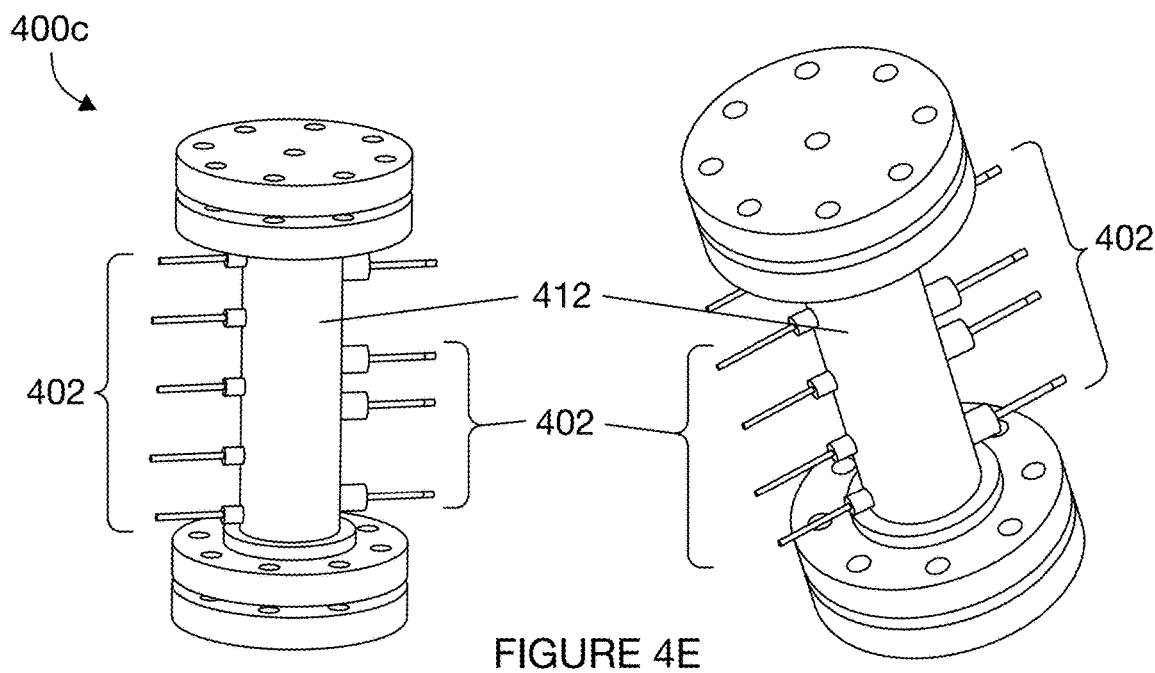
Figure 4F:
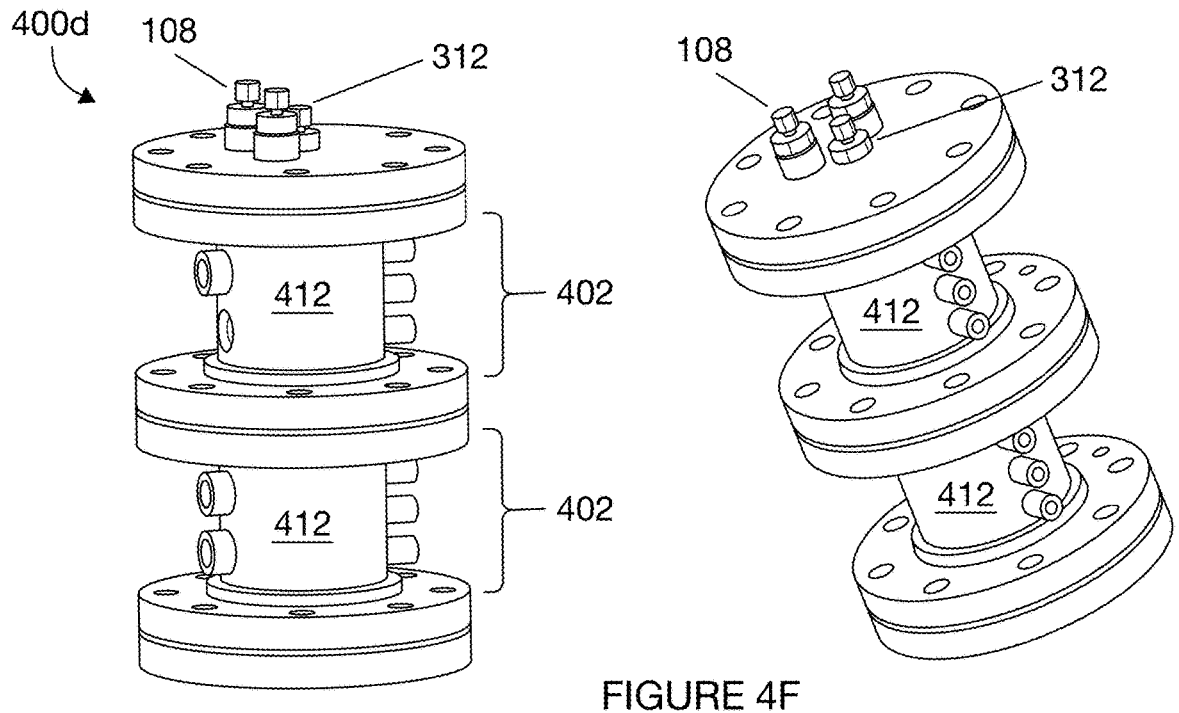
Figure 4G:
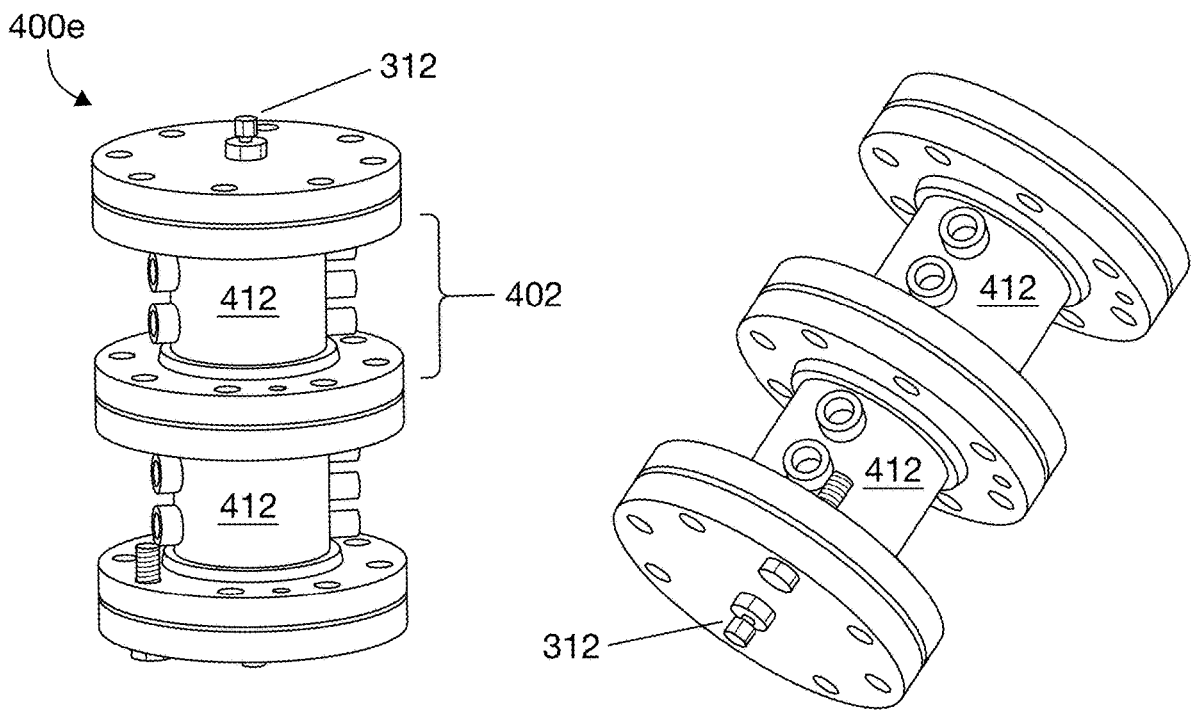
Figure 5A:
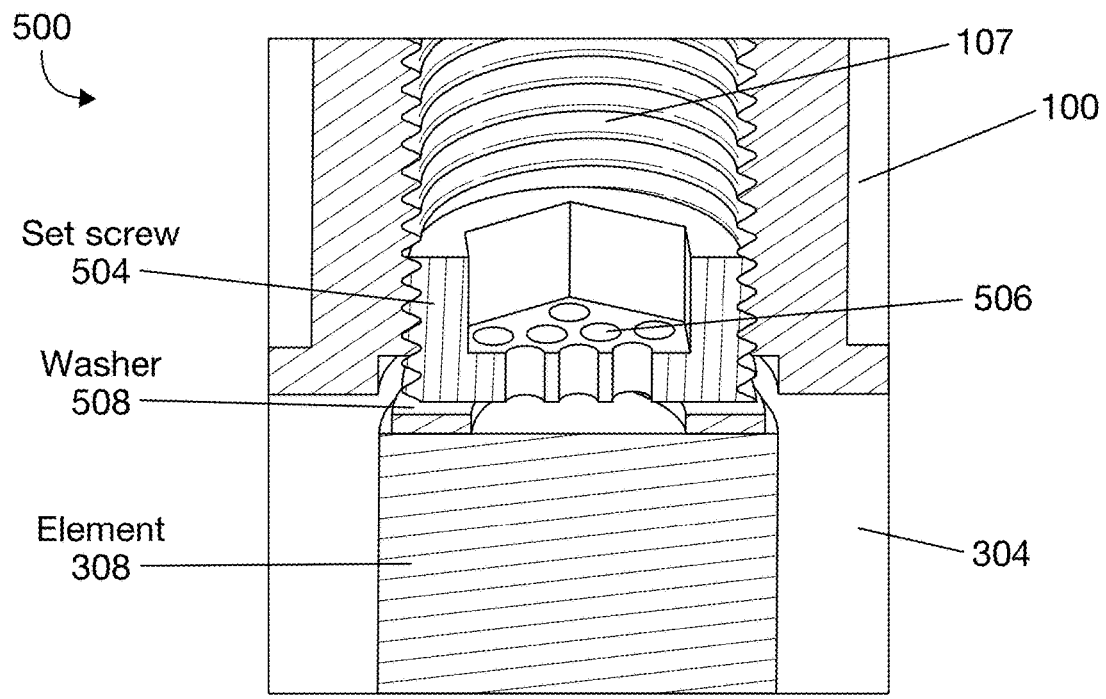
FIG. 5A-5E are several views of schematic representations of an exemplary interface 500 for an electrical coupler (e.g., section perspective views, isometric views, etc.).
Figure 5B:
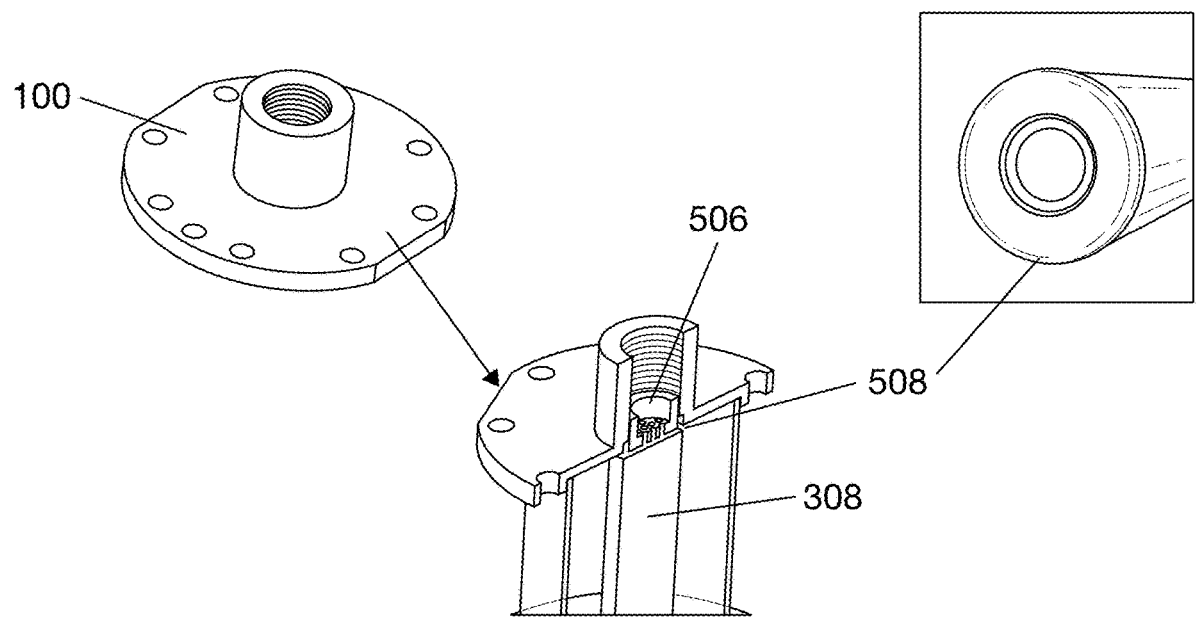
Figure 5C:
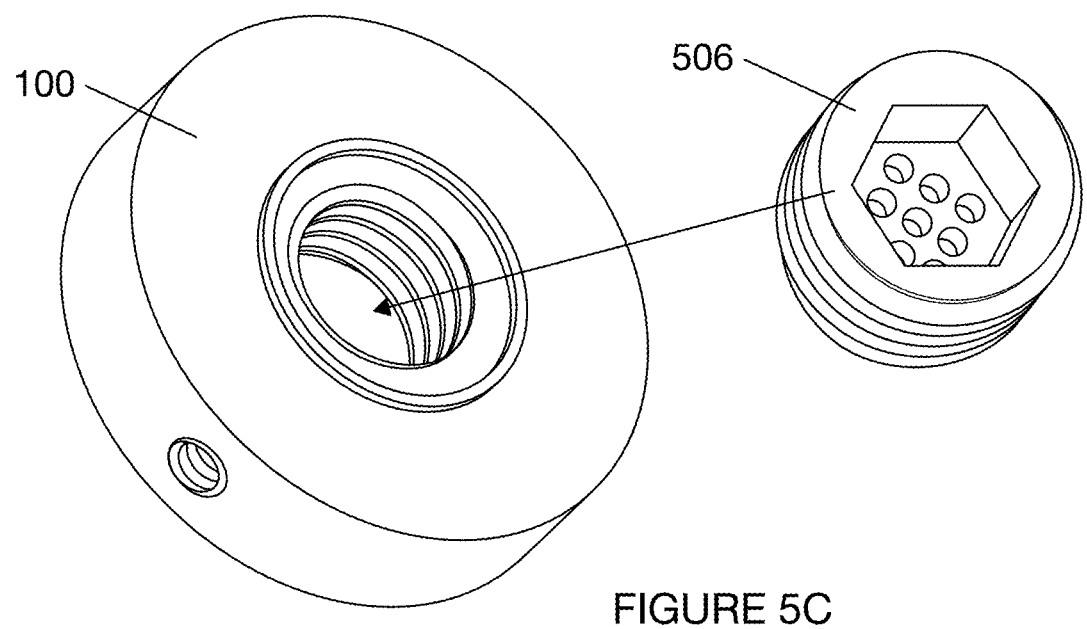
Figure 5D:
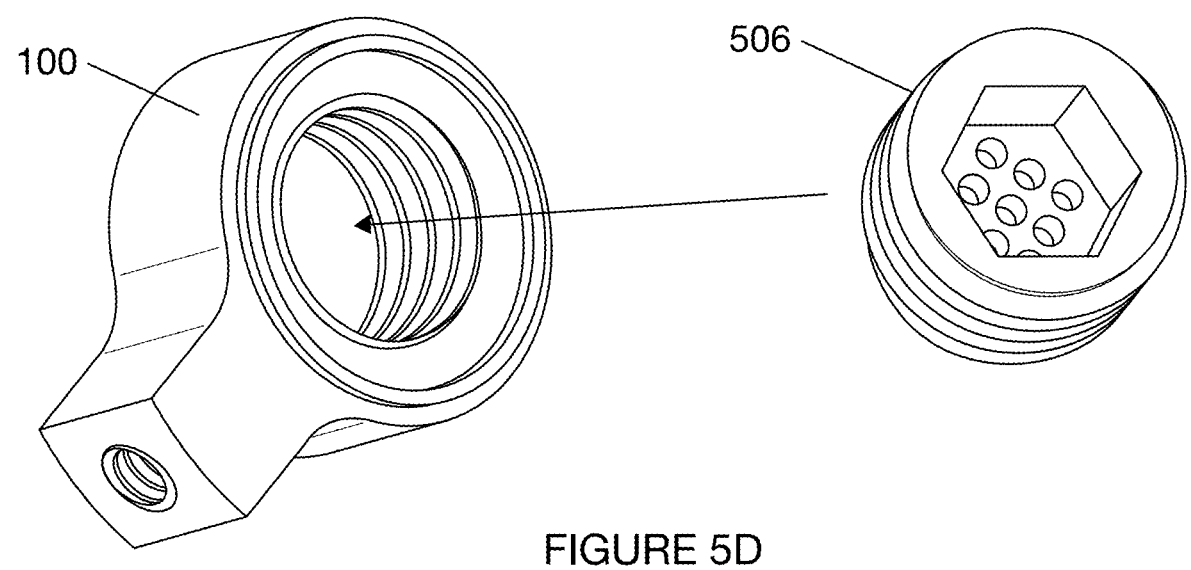
Figure 5E:
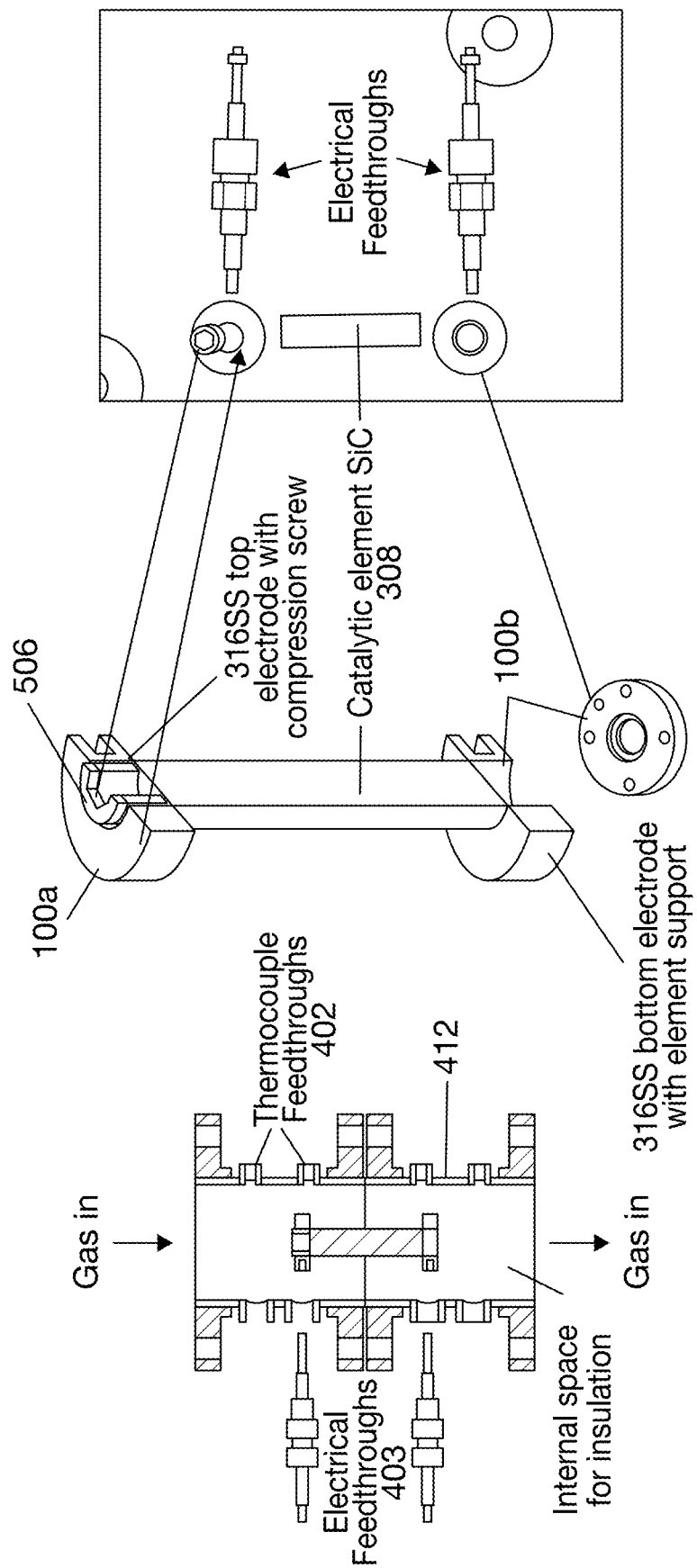

As shown for instance in elevation and isometric views in FIGS. 4E-4G, these specific examples of the reactor 400c (which can be the same as any preceding reactor with a different number) can include an insulation jacket 412 disposed around the catalytic element 308 and the pressure vessel 304. In various embodiments, the insulation jacket 412 can be formed partially or wholly by the pressure vessel 304. In various embodiment, the insulation jacket 412 can be physically touching the pressure vessel 304. In various embodiments, the insulation jacket 412 can be spaced from the pressure vessel 304 (e.g., forming an annular space therebetween). In various embodiments, the insulation jacket 412 can have the same planform shape as the pressure vessel 304, for example circular. In various embodiments, the insulation jacket 412 can have a different planform shape, for example the pressure vessel can be a cylinder (with a circle cross section) and the insulation jacket 412 can be prismatic, having a rectangular cross section. Insulation jacket 412 can have any number of thermocouple feedthroughs 402 spaced along the axial direction, or radially about the perimeter. In various embodiments, insulation can alternatively or additionally be disposed within the pressure vessel. Additionally, the pressure vessel itself can be any material that is able to withstand the reaction conditions. For example, and without limitation, stainless steel, Inconel, refractory-lined pipe (e.g., using a pipe made from steel, stainless, etc.), or other suitable materials may be used.

As shown for instance in FIGS. 4F-4G, the exemplary reactors 400d, 400e (which can be the same as or distinct from other exemplary reactors) can have pressure vessels that are separated by an interstitial connection point along the axial direction of the reactor 400d, 400e. In various embodiments, pressure vessel 412 can be formed from any number of components and mechanically coupled together via one or more mechanical fasteners such as nuts and bolts threaded though corresponding flange holes. Reactor 400d is depicted with both power interfaces 108 and fluid flow interface 312 formed in a first end, while reactor 400e is depicted with the fluid flow interface 312 disposed on both ends of the reactor. The pressure vessel 412 can be configured to have any number or type of interfaces to couple to various external systems (e.g., sensors, gas, power, etc.). In these exemplary reactors, insulation can be included between the pressure vessel walls and the catalytic element (and/or at other suitable locations within the reactor).

The specific examples as represented in FIGS. 1, 3 and 4 show a schematic design of an electrical coupler (e.g., cylindrical conductor, contactor, electrode) 100 in which one side has a threaded connection for mating to a gas supply line, while the other side has a countersink design to accept a catalytic (resistive) element 308. The catalytic element 308 can be bonded to the electrical coupler 100a, 100b using mechanical and/or chemical bonding techniques. Reactor 300 is shown with electrical couplers (contactors) 100a, 100b as described herein above. Additionally, reactor 300 is shown to have a fluid flow 312 flowing through a conduit coupled to the electrical coupler 100*a*. One of ordinary skill in the art would appreciate that a threaded tube connection as shown is only one example of a system and method of delivering process gas to the reactor 300.

Exemplary reactor 300 has a pressure vessel 304 sealably coupled to (e.g., forming a hermetic seal between) electrical couplers 100*a*, 100*b* and extending therebetween. Electrical couplers 100*a*, 100*b* are shown to be coupled together via a plurality of electrically isolated threaded rods extending therebetween, fixed in place by washers and nuts threaded on opposite and opposing surfaces of each. However, other coupling mechanisms can be used. Reactor 300 has catalytic element 308 disposed within pressure vessel 304. The catalytic element 308 is shown as red and yellow-hot as it is heated by electrical energy provided by contact with one or both of electrical couplers 100*a*, 100*b*. One of ordinary skill in the art would appreciate that the depiction of the catalytic element 308, regardless of pictorial coloration does not intend to limit it the temperatures of which the reactor 300 operates at, is capable of withstanding or optimized for. Additionally, one of ordinary skill in the art would appreciate that the pictorial representations herein do not intend to limit the types of reactions that may take place within reactor 300.

The interface 500 can include the at least one opening 107 (e.g., as shown for example in a threaded configuration in FIGS. 5A, 5C, 5D, and 5E). In various embodiments (e.g., where the at least one opening 107 is formed as a plurality of openings), each opening of the plurality can be radially spaced about a central axis of the electrical coupler 100, each opening can be threaded, or another mechanical interface can be utilized. In some variations, the interface 500 can include a set screw 504. Set screw 504 can be configured to thread within the at least one opening 107. The set screw 504 may be configured to enter the opening 107 from above (e.g., defined relative to FIG. 5) and be rotated down the opening 107 until it is proximate the second side of the electrical coupler 100, near the interface 105 (not shown). Set screw 504 can have a hexagonal opening formed therein, configured to mate with one or more standard tools, such as an Allen key, Allen wrench, Hex key, or the like. In various embodiments, set screw 504 can include geometric features configured to matingly-couple with any number of tools, such as Phillips of flathead screwdriver, drill driver, impact driver or the like.

In various embodiments, set screw 504 may be formed from the same material as electrical coupler 100. In various embodiments, set screw 504 can be formed from any electrically conductive material, partially insulating material, semiconducting material, material combination (e.g., alloy, cermet, etc.), and/or other suitable material (e.g., electrical coupler material, substrate material, catalyst material, etc.). In various embodiments, set screw 504 can have a similar or the same coefficient of thermal expansion as the electrical coupler 100 (e.g., be formed from the same material).

In various embodiments, set screw 504 has one or more openings 506 configured to allow fluid flow therethrough. As shown for example in FIGS. 5A and 5B, set screw 504 can include a plurality of openings regularly spaced within the proximate side of the set screw to the catalytic element 308. Additionally or alternatively, there may be a single opening 506. In various embodiments, any of the openings 506 can be irregularly shaped, regularly shaped, circular, oblong, slots, a mesh/screen, and/or have any suitable structure. In various embodiments, interface 500 can includes a compressive element 508 (for example a washer). In various embodiments, the compressive element 508 can be compressed by the rotation of the set screw 504 and driven into contact with the catalytic element 308. The compressive element 508 can be formed from any material (e.g., catalyst material, substrate material, electrical coupler material, interface material, etc.). Compressive element 508 can be configured to deform, whether elastically or plastically in response to the compression from the set screw 504. For example, compressive element 508 can be a disc spring or Belleville washer, where the washer is formed with an angle surface, such that the outer and inner perimeters lie out of plane with one another. The set screw 504 can compress the perimeter of the washer spaced from the top of the catalytic element 308, deforming the washer downward and ensuring contact between the electrical coupler 100 and the catalytic element 308 by the resistive spring force of the washer opposing compression. In another example, the compressive element 508 can be a metal foam. The metal foam can have a spring constant or shape memory, such that when compressed by the set screw 504 downward, the metal foam opposes said compression and presses back between the set screw 504 and the catalytic element 308, thereby maintaining electrical communication therebetween. In various embodiments, compressive element 308 can be a spiral spring, leaf spring, internal or external tooth washer, helical washer, crinkle washer, split lock washer, fender washer, flat washer or the like.

As an illustrative example, the compressive element 508 can be a washer. The washer can be bonded to the catalytic element 308 and pressed against the electrical coupler 100. In various embodiments, electricity may flow from the electrical coupler to the compressive element 508 to the catalytic element 308, to a second compressive element 508 to the second electrical coupler 100. In various embodiments, the compressive element 508 may be bonded with the catalytic element 308 via a carbon paste.

Figure 6:
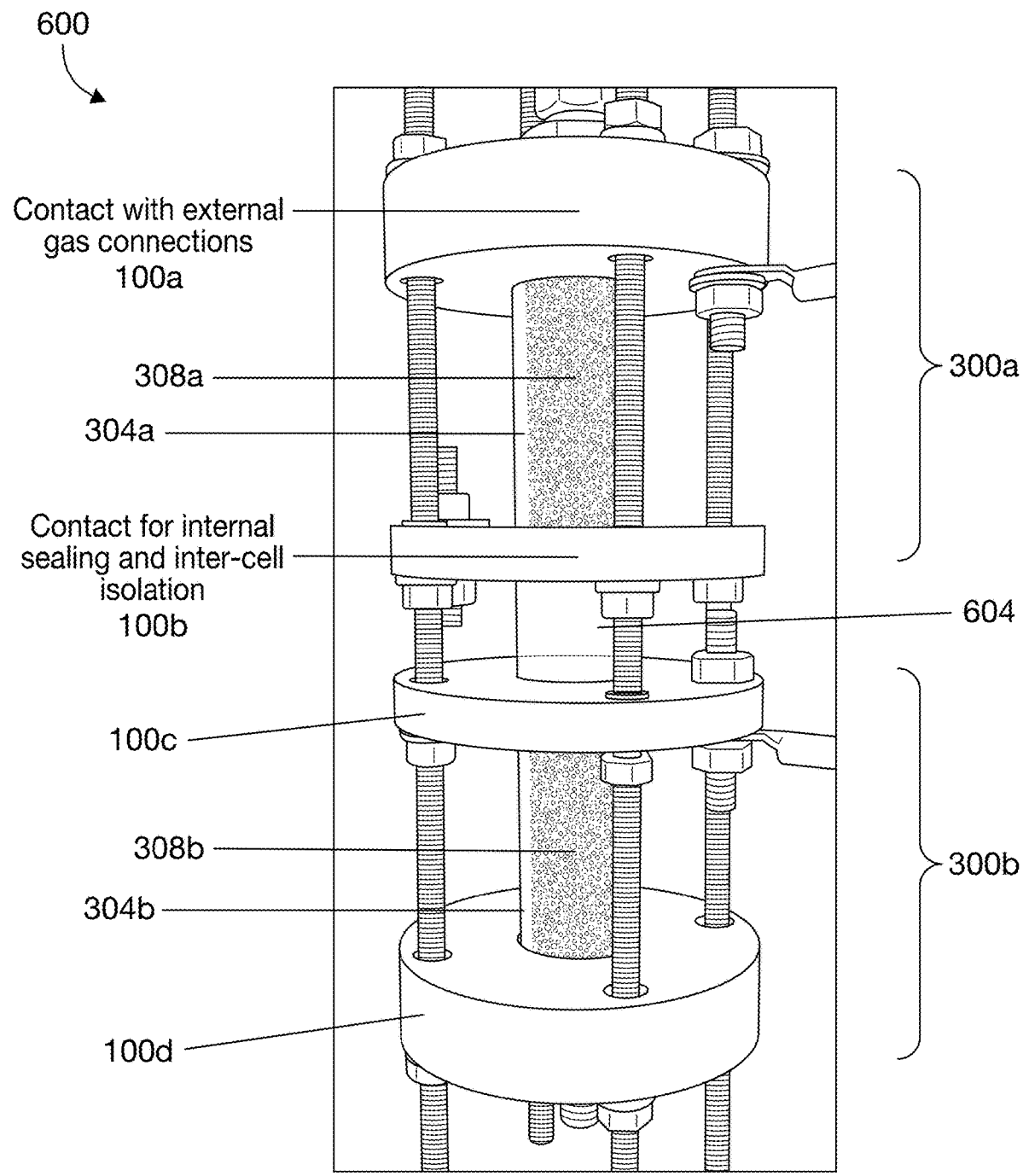
FIG. 6 is a schematic representation of an electrical coupler for resistively heated reactor systems.

As shown for example in FIG. 6, a multi-cell reactor system (e.g., reactor 600) can include a plurality of electrical couplers and catalytic elements (e.g., reaction modules). In this example of the reactor, the larger contacts at the ends can provide reactant gas delivery and product gas exit interfaces, while the intermediate electrical couplers can enable the sealing and electric isolation of adjacent cells with the use of a dielectric intermediate component (e.g., a quartz tube).

Exemplary reactor 600 may include one or more reactors 300 emplaced therein. For example, and without limitation, reactor 600 can include any number of cells, each cell formed by an individual reactor 300. Reactor 600 can be a two-cell reactor system with multiple electrical couplers arranged to create a single fluid flow path through multiple resistive elements arranged in series with external power supply line interfaces. For instance, reactor 300*a* can have an electrical coupler 100*a* shown at the topmost portion with a pressure vessel 304 sealably coupled therewith, where the pressure vessel 304*a* has a catalytic element 308*a* therewithin. In examples of a multicell reactor, each cell can be in fluid communication by a common pressure vessel 304 and/or the reaction cells can be fluidically isolated. The pressure vessel 304 can extend from reactor 304*a* to reactor 304*b*, with electrical couplers 100*b*, 100*c* emplaced between the proximal and distal ends of the reactor 600 for internal sealing and inter-cell isolation. Additionally, or alternatively, each reactor 300*a*, 300*b* can have a separate pressure vessel in fluid communication with one another. For example, and without limitation, the first pressure vessel 304*a* can extend from first electrical coupler 100*a* to second electrical coupler 100*b*, where each of the couplers contacts the catalytic element within the pressure vessel 304a. Additionally or alternatively, a bridge pressure vessel 604 can extend between the second and third electrical couplers 100b, 100c. Then a second pressure vessel 304b can extend from the third electrical coupler 100c to the fourth electrical coupler 100d, with the second catalytic element 308b in electrical communication with both the third and fourth electrical couplers 100c, 100d. The catalytic elements 308a and 308b can extend within the pressure vessel between electrical couplers, for example catalytic element 308a can extend from 100a to 100b and catalytic element 308b can extend from 100c to 100d. In various embodiments, each cell can have its own pressure vessel that are fluidly and/or electrically isolated from one another (e.g., each having their own fluid inlets). In various embodiments, each cell of reactor 600 can operate at a distinct temperature. In various embodiments, a common negative electrode may be used in the multi-cell system to improve volumetric efficiency. For example, two cells in series may use a shared contact as a common ground to minimize space in reactor 600.

Figure 7:
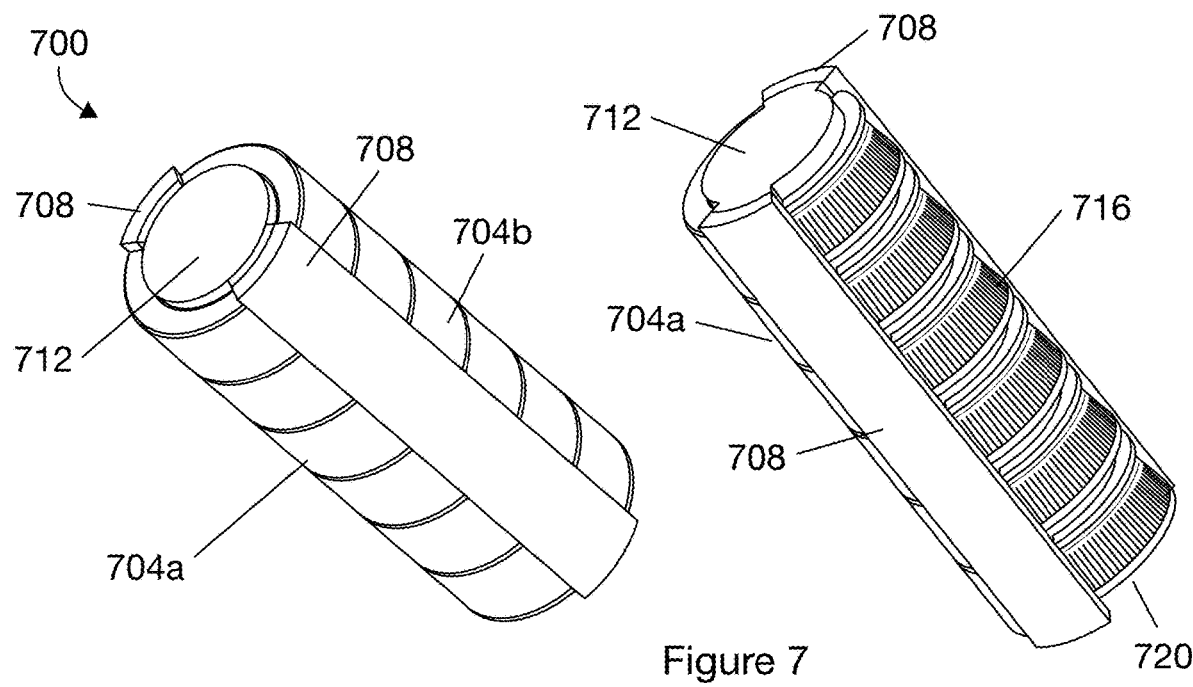
FIG. 7 is an example of a radial coupler for a resistively heated reactor systems.

In various embodiments (as shown for an exemplary radial rector 700 in FIG. 7 for instance), one or more power interfaces can be electrically connected to one or more of electrical couplers 704a, 704b. In various embodiments, electrical couplers 704a can be a positive electrode and electrical couplers 704b can be negative electrodes. In various embodiments, each electrical couplers 704a, 704b can each be electrically connected to a separate power source. In various embodiments electrical couplers 704a can each be electrically connected to one another, wherein current flows through each of the electrical couplers 704a. In various embodiments, electrical couplers 704a can have varying resistance or material properties configured to evenly heat the radial reactor 700 from a single power interface. For example, and without limitation, the end electrical coupler 704a can have a lower resistance than the middle electrical coupler 704a, such that each of the electrical couplers provide even heat to the catalytic elements. In various embodiments, each of the radial electrical couplers 704a, 704b can be configured such that current flows radially across the elements. The power interfaces can be formed as feedthroughs configured to electrically connect to one or more patterned fingers.

In various embodiments, radial reactor 700 can include one or more longitudinal separators 708. The separators 708 can be formed from one or more ceramics (and/or other suitable electrically insulating materials). In various embodiments, separators 708 can have the same radius as each of the electrical couplers 704a, 704b and electrically isolate electrical couplers 704a, 704b from one another. Separators 708 can extend from a distal end of the radial electrical coupler 700 to a proximal end of the radial electrical coupler 700, providing both structural rigidity, electrical isolation, and fluid flow directionality. In various embodiments, fluid flows through a porous inlet 712 through the longitudinal axis of radial electrical coupler 700. Separators 708 can be configured to direct the fluid flow longitudinally through the central portion of the reactor 700.

Examples of radial reactor 700 can include a plurality of ring-shaped elements 716, each associated with a electrical coupler 704a, 704b. In various embodiments, each electrical coupler 704a, 704b, and/or a subset thereof can have electrical coupling interfaces for electrical connection to one or more wires or other means of conveying electrical current. In various embodiments, the electrical coupling interfaces can include tabs, holes, clamps, or the like. In various embodiments, the catalytic elements 716 can be the same or similar to catalytic element 308 (and/or other catalytic elements described herein). In various embodiments, proximate elements can be of the same or different materials. In various embodiments, one or more components such as a current distributor can be connected to each of the catalytic elements 716 such that the patterned fingers will physically abut and compress. In various embodiments, each of the catalytic elements 716 can be electrically and/or fluidically connected in series. In various embodiments, each the catalytic elements 716 can be electrically and/or fluidically connected in parallel. In various embodiments, a first portion of catalytic elements 716 can be connected in series and a second portion can be connected in parallel. In various embodiments, fluid can flow around the outside of the radial coupler 700 and/or through the catalytic elements 716 stacked to form it. In various embodiments, each catalytic element 716 in the stack can be heated by its own corresponding electrical couplers 704a, 704b. In various embodiments, each catalytic element 716 can be selectively heated by its electrical coupler 704a, 704b at a different rate than adjacent or other catalytic elements 716. In various embodiments, each electrical coupler 704a, 70b can operate independently of the others. In various embodiments, each catalytic element 716 can be sized or configured to be evenly heated by one or more electrical couplers 704a, 704b. In various embodiments, the resistance of each catalytic elements 716 can be adjusted (e.g., by geometrical features, material selection, etc.). For example, and without limitation, the catalytic elements 716 can be formed from varying densities based on longitudinal location of or within the radial reactor 700. Radial reactor 700 can have a porous fluid outlet 720 disposed oppositely from the fluid inlet 712. In various embodiments, the fluid outlet 720 can be configured similarly to the fluid inlet 712. The fluid inlet 712 and fluid outlet 720 can be generally circular or arcuate in planform shape. In various embodiments, the fluid inlet 712 and fluid outlet 720 can be formed to fully cover the circular end of the electrical couplers 716. In various embodiments, fluid inlet 712 and fluid outlet 720 can mechanically couple to separators 708 and/or catalytic elements 716 abutting thereto.

In a first illustrative example of a thermal reactor, the thermal reactor can comprise a reaction module comprising: a first electrode; a catalytic element; and a second electrode; wherein the catalytic element is disposed between the first electrode and the second electrode, wherein the catalytic element is resistively heated to a temperature greater than about 1000° C. by an electrical current provided between the first electrode and the second electrode, wherein a fluid flows through the first electrode into the catalytic element; wherein the first and second electrode determine a flow distribution of fluid through the catalytic element. In variations of the first illustrative example, a pressure drop of the fluid through the first electrode is less than a pressure drop of the fluid through the catalytic element.

In a second illustrative example, the catalytic element of the first illustrative example can comprise a substrate comprising refractory material and a catalytic material disposed on the substrate, wherein the substrate comprises a high surface area.

In a third illustrative example, the refractory material of the second illustrative example can comprise at least one of: silicon carbide, tungsten, molybdenum, molybdenum disilicide, tungsten carbide, titanium carbide, graphite, molybdenum carbide, zirconium carbide, hafnium carbide, vanadium carbide, niobium carbide, chromium carbide, tantalum carbide, rhenium carbide, rhodium carbide, ruthenium carbide, osmium carbide, or iridium carbide.

In a fourth illustrative example, the first electrode and the second electrode of the first, second, or third illustrative example can comprise at least one of: silicon carbide, tungsten, molybdenum, molybdenum disilicide, tungsten carbide, titanium carbide, graphite, molybdenum carbide, zirconium carbide, hafnium carbide, vanadium carbide, niobium carbide, chromium carbide, tantalum carbide, rhenium carbide, rhodium carbide, ruthenium carbide, osmium carbide, or iridium carbide.

In a fifth illustrative example, the substrate of any of the second, third, or fourth illustrative examples can comprise a foam.

In a sixth illustrative example, the first electrode and the second electrode of any of the first, second, third, fourth, or fifth illustrative examples are mechanically connected to the catalytic element such that electrical current flows between the first electrode and the second electrode through the catalytic element.

In a seventh illustrative example, the first electrode and the second electrode of any of the first, second, third, fourth, fifth, or sixth illustrative examples are adhered to the catalytic element using an adhesive, wherein electrical current flows between the first electrode and the second electrode through the adhesive and the catalytic element. In a variation of the seventh illustrative example, the first electrode and the second electrode are connected to the catalytic element by chemical bonds (e.g., the first electrode, the second electrode, and the catalytic element are fabricated as a single object).

In an eighth illustrative example, the first electrode of any of the first, second, third, fourth, fifth, sixth, or seventh illustrative examples defines through-holes, wherein the fluid flows through the through-holes.

In a ninth illustrative example, the first electrode of any of the first, second, third, fourth, fifth, sixth, or seventh illustrative examples comprises a mesh, wherein the fluid flows through gaps in the mesh.

In a tenth illustrative example, the first electrode, the catalytic element, and the second electrode of any of the first, second, third, fourth, fifth, sixth, seventh, eighth, or ninth illustrative examples each have approximately the same cross-sectional size and the same cross-sectional shape.

In an eleventh illustrative example, the fluid of any of the first, second, third, fourth, fifth, sixth, seventh, eighth, ninth, or tenth illustrative examples comprises hydrogen gas, carbon monoxide, carbon dioxide, and water vapor.

In a twelfth illustrative example, the thermal reactor of any of the first, second, third, fourth, fifth, sixth, seventh, eighth, ninth, tenth, or eleventh illustrative examples, further comprises a second reaction module, wherein the second reaction module is arranged in a parallel flow stream to the reaction module.

In a thirteenth illustrative example, the second electrode any of the first, second, third, fourth, fifth, sixth, seventh, eighth, ninth, tenth, eleventh, or twelfth illustrative examples is arranged upstream of the catalytic element relative to the fluid flow.

In a fourteenth illustrative example, the reaction module (or catalytic element thereof) any of the first, second, third, fourth, fifth, sixth, seventh, eighth, ninth, tenth, eleventh, twelfth, or thirteenth illustrative examples comprises a U-shape or a V-shape.

In a fifteenth illustrative example, a method for operating a thermal reactor comprises flowing a fluid over or through a catalytic element; and heating the catalytic element to at least a threshold temperature using electrically resistive heating; wherein the fluid flows through void spaces defined by an electrode prior to flowing over or through the catalytic element, wherein the electrode provides electrical current used to resistively heat the catalytic element to the catalytic element.

In a sixteenth illustrative example, the catalytic element of the fifteenth illustrative example comprises a substrate comprising refractory material and a catalytic material disposed on the substrate, wherein the substrate comprises a high surface area.

In a seventeenth illustrative example, the refractory material of the sixteenth illustrative example comprises at least one of: silicon carbide, tungsten, molybdenum, molybdenum disilicide, tungsten carbide, titanium carbide, graphite, molybdenum carbide, zirconium carbide, hafnium carbide, vanadium carbide, niobium carbide, chromium carbide, tantalum carbide, rhenium carbide, rhodium carbide, ruthenium carbide, osmium carbide, or iridium carbide.

In an eighteenth illustrative example, the first electrode and the second electrode of the fifteenth, sixteenth, or seventeenth illustrative example comprises at least one of: silicon carbide, tungsten, molybdenum, molybdenum disilicide, tungsten carbide, titanium carbide, graphite, molybdenum carbide, zirconium carbide, hafnium carbide, vanadium carbide, niobium carbide, chromium carbide, tantalum carbide, rhenium carbide, rhodium carbide, ruthenium carbide, osmium carbide, or iridium carbide.

In a nineteenth illustrative example, the substrate of any of the sixteenth, seventeenth, or eighteenth illustrative example comprises a foam.

In a twentieth illustrative example, the fluid of any of the fifteenth, sixteenth, seventeenth, eighteenth, or nineteenth illustrative example comprises hydrogen gas, carbon monoxide, carbon dioxide, and water vapor.

In a twenty-first illustrative example, either (independently or together) the catalytic element of or an electrical coupler of (singular or plurality) any of illustrative examples 1-14 can be used (e.g., for applications in addition to or as an alternative to thermal reactors such as air or other fluid purifiers, carbon capture, electrolysis, electroplating, etc.).

In a twenty-second illustrative example, an electrical coupler (e.g., for a resistively heated reactor system, the electrical coupler comprising: an electrical conductor having a first end and a second end, defining a thickness therebetween, each of the first end and the second end having a first interface in the first end and a second interface in the second end; and at least one opening extending from the first end to the second end, the at least one opening configured to allow a fluid to flow through the electrical coupler.

In a twenty-third illustrative example, a resistively heated reactor comprising: a proximal end having a planar porous gas inlet; at least one catalytic element having a first end and a second end with a sidewall extending therebetween; a first electrical contactor having a first end and a second end, defining a contactor sidewall therebetween, the contactor sidewall configured to circumscribe a first portion of the sidewall of the at least one catalytic element, a second electrical contactor having a first end and a second end, defining an contactor sidewall therebetween, the contactor sidewall configured to circumscribe a second portion of the sidewall of the at least one catalytic element, the second electrical contactor laterally spaced from the first electrical contactor; a first separator disposed between the first and second electrical contactors circumscribing the at least one catalytic element; a second separator disposed between the first and second contactors circumscribing the at least one catalytic element, the second separator spaced oppositely from the first separator; and a distal end having a planar porous gas outlet.

In a twenty-fourth illustrative example, the resistively heated reactor of the twenty-third illustrative example, further comprising: a plurality of catalytic elements axially aligned from the proximal end to the distal end; a corresponding plurality of first and second electrical contactors circumscribing each catalytic element, wherein the first and second electrical contactors are separated by the first and the second separator, the first and second separator extending from the proximal end to the distal end, circumscribing a portion of each catalytic element.

In a twenty-fifth illustrative example, a resistively heated reactor comprising: a pressure vessel having a first vessel end and a second vessel end with a sidewall circumscribing each and extending therebetween; a first electrical coupler disposed at the first vessel end, the first electrical coupler having a first electrical conductor having a first end and a second end, defining a thickness therebetween, at least one opening extending from the first end to the second end, the at least one opening configured to allow a fluid to flow therethrough into the pressure vessel, a second electrical coupler disposed at the second vessel end, the second electrical coupler having a second electrical conductor having a third end and a fourth end, defining a thickness therebetween, at least one opening extending from the third end to the fourth end, the at least one opening configured to allow a fluid to flow from the pressure vessel through the second electrical coupler; a catalytic element disposed within the pressure vessel, the catalytic element in contact with the first electrical coupler and the second electrical coupler.

In a twenty-sixth illustrative example, the electrical coupler of any of the twenty-second through twenty-fifth illustrative example, wherein the electrical conductor is formed from a refractory metal.

In a twenty-seventh illustrative example, the electrical coupler the twenty-sixth illustrative example, wherein the refractory metal is at least one of tungsten, molybdenum, niobium, tantalum and/or an alloy thereof.

In a twenty-eighth illustrative example, the electrical coupler or thermal reactor of any of the twenty-second through twenty-seventh illustrative examples, wherein the conductive material is a metal.

In a twenty-ninth illustrative example, the electrical coupler or thermal reactor of the twenty-eighth illustrative example, wherein the metal is at least one of nickel, copper, gold, titanium, aluminum, or stainless steel.

In a thirtieth illustrative example, the electrical coupler or thermal reactor of any of the twenty-second through twenty-ninth illustrative examples, wherein the electrical conductor is a conductive ceramic.

In a thirty-first illustrative example, the electrical coupler or thermal reactor of thirtieth illustrative example, wherein the conductive ceramic is at least one of silicon carbide, tungsten carbide, niobium carbides and/or titanium carbide.

In a thirty-second illustrative example, the electrical coupler or thermal reactor of any of the twenty-second through thirty-first illustrative examples, wherein the electrical conductor is formed from a composite material.

In a thirty-third illustrative example, the electrical coupler or thermal reactor of the thirty-second illustrative examples, wherein the composite material is a cermet.

In a thirty-fourth illustrative example, the electrical coupler or thermal reactor of any of the twenty-second through thirty-third illustrative examples, wherein the electrical coupler is formed from a single continuous body.

In a thirty-fifth illustrative example, the electrical coupler or thermal reactor of any of the twenty-second through thirty-fourth illustrative examples, wherein the at least one opening is a borehole formed normally to the first end and the second end, the borehole having a diameter of approximately 0.5 to 10 centimeters.

In a thirty-sixth illustrative example, the electrical coupler or thermal reactor of any of the twenty-second through thirty-fourth illustrative examples, wherein the at least one opening is a plurality of openings formed from the first end to the second end, each of the plurality of openings having a diameter of approximately 0.01 to 5 centimeters.

In a thirty-seventh illustrative example, the electrical coupler or thermal reactor of the thirty-sixth illustrative example, wherein the plurality of openings are formed in ring disposed concentrically with a normal axis extending from a center of the first end to a center of the second end.

In a thirty-eighth illustrative example, the electrical coupler or thermal reactor of any of the twenty-second through thirty-fourth illustrative examples, wherein the at least one opening is a plurality of channels formed in the electrical coupler, the electrical coupler formed as a metallic foam having a plurality of channels therethrough.

In a thirty-ninth illustrative example, the electrical coupler or thermal reactor of any of the twenty-second through thirty-eighth illustrative examples, further comprising at least one electrical interface.

In a fortieth illustrative example, the electrical coupler or thermal reactor of any of the twenty-second through thirty-ninth illustrative examples, further comprising at least one fastener interface.

In a forty-first illustrative example, the electrical coupler or thermal reactor of any of the twenty-second through fortieth illustrative examples, wherein the first end and the second end each comprise a circular planform shape.

In a forty-second illustrative example, the electrical coupler or thermal reactor of any of the twenty-second through forty-first illustrative examples, wherein the electrical coupler is formed from a single continuous body.

In a forty-third illustrative example, the electrical coupler or thermal reactor of any of the twenty-second through forty-second illustrative examples, wherein the pressure vessel forms a seal with each of the first and the second electrical couplers.

In a forty-fourth illustrative example, the electrical coupler or thermal reactor of any of the twenty-second through forty-third illustrative examples, wherein each of the first and the second electrical couplers have a cylindrical shape formed concentrically with the pressure vessel.

In a forty-fifth illustrative example, the electrical coupler or thermal reactor of any of the twenty-second through forty-fourth illustrative examples, wherein at least one of the first and the second electrical couplers have at least one electrical interface.

In a forty-sixth illustrative example, the electrical coupler or thermal reactor of any of the twenty-second through forty-fifth illustrative examples, wherein at least one of the first and the second electrical couplers have at least one fastener interface.

In a forty-seventh illustrative example, the electrical coupler or thermal reactor of any of the twenty-second through forty-sixth illustrative examples, wherein the first and the second electrical couplers are coupled via at least one threaded rod extending therebetween and parallel to the pressure vessel.

In a forty-eighth illustrative example, the electrical coupler or thermal reactor of any of the twenty-second through forty-seventh illustrative examples, wherein the catalytic element is contacted by the first electrical coupler by a set screw within a threaded hole of the first electrical coupler, the set screw configured to compress a compressive element against the catalytic element.

In a forty-ninth illustrative example, the electrical coupler or thermal reactor of forty-eighth illustrative example, wherein the compressive element is a washer.

In a fiftieth illustrative example, the electrical coupler or thermal reactor of forty-ninth illustrative example, wherein the washer is a Belleville washer or disc spring.

In a fifty-first illustrative example, the electrical coupler or thermal reactor of any of the twenty-second through forty-eighth illustrative examples, wherein the compressive element is a metal foam.

In a fifty-second illustrative example, the electrical coupler or thermal reactor of any of the twenty-second through fifty-first illustrative examples, further comprising a thermocouple.

In a fifty-third illustrative example, a thermal reactor comprising two or more resistively heated reactors (e.g., of any of the twenty-second through fifty-second illustrative examples) fluidly coupled in series, wherein a fluid exiting a first reactor enters a second reactor.

In a fifty-fourth illustrative example, the electrical coupler or thermal reactor of the fifty-third illustrative example, wherein each of the resistively heated reactors have a common pressure vessel extending therebetween.

In a fifty-fifth illustrative example, the electrical coupler or thermal reactor of any of the twenty-second through fifty-fourth illustrative examples, wherein the first and/or the second electrical coupler is formed form a single continuous body.

In a fifty-sixth illustrative example, the electrical coupler or thermal reactor of any of the twenty-second through forty-fifth or fifty-second through fifty-fifth illustrative examples, wherein the catalytic element and at least one of the first electrical coupler and the second electrical coupler are integrally formed.

In a fifty-seventh illustrative example, the electrical coupler or thermal reactor of any of the twenty-second through fifty-fifth illustrative examples, wherein at least one of the electrical couplers is formed from a bonded assembly.

In a fifty-eighth illustrative example, the electrical coupler or thermal reactor of any of the twenty-second through fifty-seventh illustrative examples, wherein the pressure vessel is cylindrical.

In a fifty-ninth illustrative example, the electrical coupler or thermal reactor of any of the twenty-second through fifty-seventh illustrative examples, wherein the pressure vessel is prismatic.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the preceding system and/or method can be used with, in addition to, in lieu of, or otherwise integrated with all or a portion of the systems and/or methods disclosed in the applications mentioned above, each of which are incorporated in their entirety by this reference.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30% of a reference), or be otherwise interpreted.

As a person skilled in the art will recognize from the previous detailed description and from the figures and claims, modifications and changes can be made to the preferred embodiments of the invention without departing from the scope of this invention defined in the following claims.

We claim:

1. A thermal reactor comprising:
a reaction module comprising:
    a vessel;
    a first electrode;
    a catalytic element; and
    a second electrode;
wherein the catalytic element is disposed between the first electrode and the second electrode, wherein the first electrode, second electrode, and vessel each comprises substantially the same cross-sectional perimeter, wherein the catalytic element is resistively heated to a temperature greater than about 1000° C. by an electrical current provided between the first electrode and the second electrode, wherein the first and second electrode determine a flow distribution of fluid through the catalytic element.

2. The thermal reactor of claim 1, wherein the catalytic element comprises a substrate comprising refractory material and a catalytic material disposed on the substrate, wherein the substrate comprises a high surface area.

3. The thermal reactor of claim 2, wherein the refractory material comprises at least one of: silicon carbide, tungsten, molybdenum, tungsten carbide, titanium carbide, graphite, molybdenum carbide, zirconium carbide, hafnium carbide, vanadium carbide, niobium carbide, chromium carbide, tantalum carbide, rhenium carbide, rhodium carbide, ruthenium carbide, osmium carbide, or iridium carbide.

4. The thermal reactor of claim 3, wherein the first electrode and the second electrode each comprise at least one of: silicon carbide, tungsten, molybdenum, tungsten carbide, titanium carbide, graphite, molybdenum carbide, molybdenum disilicide, zirconium carbide, hafnium carbide, vanadium carbide, niobium carbide, chromium carbide, tantalum carbide, rhenium carbide, rhodium carbide, ruthenium carbide, osmium carbide, or iridium carbide.

5. The thermal reactor of claim 2, wherein the substrate comprises a foam.

6. The thermal reactor of claim 1, wherein the first electrode and the second electrode are mechanically connected to the catalytic element such that electrical current flows between the first electrode and the second electrode through the catalytic element.

7. The thermal reactor of claim 1, wherein the first electrode and the second electrode are adhered to the catalytic element using an adhesive, wherein electrical current flows between the first electrode and the second electrode through the adhesive and the catalytic element.

8. The thermal reactor of claim 1, wherein the first electrode and the second electrode are connected to the catalytic element by chemical bonds.

9. The thermal reactor of claim 8, wherein the first electrode, the second electrode, and the catalytic element are fabricated as a single object.

10. The thermal reactor of claim 1, wherein the first electrode defines through-holes, wherein the fluid flows through the through-holes.

11. The thermal reactor of claim 1, wherein the first electrode comprises a mesh, wherein the fluid flows through gaps in the mesh.

12. The thermal reactor of claim 1, wherein the first electrode, the catalytic element, and the second electrode each have approximately the same cross-sectional size and the same cross-sectional shape.

13. The thermal reactor of claim 1, wherein the fluid comprises hydrogen gas, carbon monoxide, carbon dioxide, and water vapor.

14. The thermal reactor of claim 1, further comprising a second reaction module, wherein the second reaction module is arranged in a parallel flow stream to the reaction module.

15. The thermal reactor of claim 1, wherein the second electrode is arranged upstream of the catalytic element relative to the fluid flow.

16. The thermal reactor of claim 15, wherein the reaction module comprises a U-shape or a V-shape.

17. The thermal reactor of claim 1, wherein the fluid flows through the first electrode into the catalytic element; wherein a pressure drop of the fluid through the first electrode is less than a pressure drop of the fluid through the catalytic element.

18. A method for operating a thermal reactor comprising:
flowing a fluid over or through a catalytic element; and
heating the catalytic element to at least a threshold temperature using electrically resistive heating;
wherein the fluid enters the catalytic element through void spaces defined by an electrode, wherein a perimeter of the catalytic element is substantially identical to a perimeter of the electrode at a point of contact between the catalytic element and the electrode, wherein the electrode provides electrical current used to resistively heat the catalytic element, to the catalytic element.

19. The method of claim 18, wherein the catalytic element comprises a substrate comprising refractory material and a catalytic material disposed on the substrate, wherein the substrate comprises a high surface area.

20. The method of claim 19, wherein the refractory material comprises at least one of: silicon carbide, tungsten, molybdenum, molybdenum disilicide, tungsten carbide, titanium carbide, graphite, molybdenum carbide, zirconium carbide, hafnium carbide, vanadium carbide, niobium carbide, chromium carbide, tantalum carbide, rhenium carbide, rhodium carbide, ruthenium carbide, osmium carbide, or iridium carbide.

21. The method of claim 20, wherein the first electrode and the second electrode each comprise at least one of: silicon carbide, tungsten, molybdenum, molybdenum disilicide, tungsten carbide, titanium carbide, graphite, molybdenum carbide, zirconium carbide, hafnium carbide, vanadium carbide, niobium carbide, chromium carbide, tantalum carbide, rhenium carbide, rhodium carbide, ruthenium carbide, osmium carbide, or iridium carbide.

22. The method of claim 19, wherein the substrate comprises a foam.

23. The method of claim 18, wherein the fluid comprises hydrogen gas, carbon monoxide, carbon dioxide, and water vapor.

* * * * *